US011964758B2

(12) United States Patent
Jara Rodelgo et al.

(10) Patent No.: US 11,964,758 B2
(45) Date of Patent: Apr. 23, 2024

(54) AIRFOIL OF AN AERODYNAMIC SURFACE

(71) Applicant: AIRBUS OPERATIONS, S.L.U., Madrid (ES)

(72) Inventors: Álvaro Jara Rodelgo, Madrid (ES); Alfonso Parra Rubio, Madrid (ES); Pablo Vázquez Sánchez, Madrid (ES); Esteban Martino González, Madrid (ES)

(73) Assignee: Airbus Operations, S.L.U., Madrid (ES)

(*) Notice: Subject to any disclaimer, the term of this patent is extended or adjusted under 35 U.S.C. 154(b) by 77 days.

(21) Appl. No.: 17/856,567

(22) Filed: Jul. 1, 2022

(65) Prior Publication Data
US 2023/0002030 A1 Jan. 5, 2023

(30) Foreign Application Priority Data

Jul. 5, 2021 (EP) ..................................... 21382602

(51) Int. Cl.
B64C 3/48 (2006.01)
B64C 3/46 (2006.01)
B64C 3/50 (2006.01)

(52) U.S. Cl.
CPC .................. B64C 3/48 (2013.01); B64C 3/46 (2013.01); B64C 3/50 (2013.01)

(58) Field of Classification Search
CPC .... B64C 3/48; B64C 3/46; B64C 3/50; B64C 9/10
See application file for complete search history.

(56) References Cited

U.S. PATENT DOCUMENTS

| 6,257,528 | B1* | 7/2001 | Brislawn | B63H 25/381 244/211 |
| 7,896,294 | B2 | 3/2011 | Dittrich | |
| 8,609,220 | B2* | 12/2013 | Summers | B60B 23/10 428/116 |
| 8,652,602 | B1* | 2/2014 | Dolla | B29C 44/357 442/205 |
| 2008/0035788 | A1 | 2/2008 | Kothera et al. | |
| 2011/0038727 | A1* | 2/2011 | Vos | B64C 11/20 416/1 |
| 2014/0027538 | A1* | 1/2014 | Webster | B64C 3/46 239/265.43 |
| 2019/0168480 | A1* | 6/2019 | Martino-Gonzalez | B64C 3/26 |

FOREIGN PATENT DOCUMENTS

| WO | 2011/017071 | 2/2011 |
| WO | 2012/103891 | 8/2012 |

OTHER PUBLICATIONS

Extended Search Report for EP21382602.7, dated Jan. 25, 2022, 6 pages.

* cited by examiner

Primary Examiner — Rodney A Bonnette
(74) Attorney, Agent, or Firm — Nixon & Vanderhye P.C.

(57) ABSTRACT

An airfoil of an aerodynamic surface including: a control surface having an upper surface and a lower surface, and an actuator configured to elevate or lower the control surface, wherein at least a portion of one of the upper surface and the lower surface of the control surface is auxetic with a negative Poisson ratio, and the other of the upper surface and the lower surface of the control surface includes a material with a higher Poisson ratio.

17 Claims, 18 Drawing Sheets

AIRFOIL OF AN AERODYNAMIC SURFACE

RELATED APPLICATION

This application incorporates by reference and claims priority to European Patent Application EP21382602.7, filed Jul. 5, 2021.

TECHNICAL FIELD

The present invention belongs to the field of aircraft movable parts, namely to the configuration and integration of control surfaces within aerodynamic surfaces. More in particular, the invention relates to the architecture of the control surfaces and actuating means to move control surfaces.

BACKGROUND

Aircraft conventionally comprise two or more aerodynamic surfaces or lifting surfaces (understood as equivalent terms herein) for generating lifting forces in-flight, which are typically divided into a leading edge section (facing the incoming airflow), a torsion box (providing rigidity to bending and torsion moments), and a trailing edge section. The leading edge section, torsion box and trailing edge section are arranged in this order in a chordwise direction and each section being subsequently connected to the next section.

Optionally, aerodynamic surfaces may also comprise one or more control surfaces at the leading or trailing edge with the aim of e.g., delaying the stall point, allowing in-flight maneuvers, controlling flow separation, increasing the lifting timely, etc. Surrounding all these components, the aerodynamic surfaces comprise upper and lower surfaces forming an airtight enclosure which is typically continuous except in the mechanical connections between torsion box and the control surface to allow its deflection, i.e., the elevation or lowering.

As known, in aeronautics, aerodynamic surfaces are typically known as wings, but empennage structures such as the Vertical Tail Plane ('VTP') or the Horizontal Tail Plane ('HTP') may also embody these aerodynamic surfaces. Unlike wings or HTP that are geometrically designed to generate lift, and generally comprise non-symmetrical airfoils, VTP comprise a symmetrical geometry whose camber is the same at both sides of the centerline. This is because VTP may generate pulling or pushing forces at both sides, enabling yaw rotation of the aircraft.

Regarding existing control surfaces in aircraft, they are typically made of rigid fairings reproducing a separate and movable airfoil mechanically deflected thanks to dedicated actuators producing their controlled movement around a fixed hinge axis downwards the rear spar of the torsion box. Actuators implemented nowadays are either hydraulic, electric or hybrid and are responsible for deflection of the control surface.

The space between the rear spar and the movable, separate control surface, i.e., where part of the actuating system and hinges are usually located, is typically covered by rigid aerodynamic fairings. These fairings are not deformable and, once the control surfaces are actuated (i.e. defected), they cause an abrupt change in the external geometry of the aerodynamic surface (e.g. wing) that alters the aerodynamic continuity around the transition line between the rigid fairing and the control surface. This abrupt transition of the outer geometry of the airfoil, between the rigid fairing and the control surface, has a negative impact on drag and flow separation at lower airspeeds.

Modern aircrafts are generally equipped with two kind of control surfaces. A primary kind of flight control surfaces such as: ailerons mounted on the trailing edge of each wing near the wingtips allow to control the roll rotation of the aircraft, elevators typically mounted on the trailing edge of the HTP allow to control the pitch rotation of the aircraft, and a rudder typically mounted on the trailing edge of the VTP allows to control the yaw rotation of the aircraft.

A second kind of flight control surfaces comprise high-lift devices such as: slats, also known as leading edge devices, which are extensions to the front of a wing for lift augmentation, and are intended to reduce the stall speed by altering the air flow over the wing, flaps, mounted on the trailing edge of each wing, and spoilers, used to disrupt airflow over the wing and greatly reduce lift, allow a glider pilot to lose altitude without gaining excessive airspeed.

These second kind of flight control surfaces tend to lower the minimum speed at which the aircraft can be safely flown, and to increase the angle of descent for landing.

All these surfaces are extended or deployed for manoeuvres, during critical phases such as approaching or landing, and are controlled by a Flight Management System ('FMS') of the aircraft to operate safely.

With the advent of new materials, in order to tightly adapt the morphology of the airfoils to in situ flight conditions, it has been proposed to manufacture said separate control surfaces with flexible material, for instance, with auxetic materials, known for presenting high mechanical properties.

Auxetic structures are characterized by having negative Poisson ratios so that they deform alike along and transversally to the direction of an applied force. That is, under a force applied longitudinally which tends to contract (or extend) the material, they contract (respectively extend) in a transverse direction.

These elements are known for being capable of providing contraction (or extension) to an airfoil in its transversal direction while not producing any deformation along its longitudinal direction.

Be the case as it may, these aerodynamic surfaces presenting this purposive and in situ deformable flexible material are more commonly called 'morphing structures'. These morphing structures provide to the wings, VTP or HTP, the capacity to adapt to specific flight conditions and improve the performances of the aircraft thanks to adjustments of parameters like the span, the chord, the camber, the sweep etc. of the conventional lifting surfaces.

However, all the known ways for integrating flexible materials to allow morphing behavior have been deemed inefficient for control surfaces as they greatly impact either on the structural stability or reduce lifting boosting. Accordingly, there is a need for a solution to overcome the above-mentioned drawbacks.

SUMMARY

In this document, reference shall be made to a number of particular terms for which a description will be now provided. Therefore, these terms must be construed as follows.

In relation with the geometry of aerodynamic surfaces, the wing, the horizontal stabilizer ('HTP', Horizontal Tail Plane) and the vertical stabilizer ('VTP', Vertical Tail Plane) of an aircraft are all based on airfoil sections.

Also in relation with the aerodynamic surfaces of a wing or a HTP, said aerodynamic surfaces have an upper surface, so-called 'extrados' or 'suction face', and a lower surface, so-called 'intrados' or 'pressure face'. These surfaces aim at keeping the aero-shape of the airfoil. Furthermore, by "upper surface" it can be defined only a part of the entire upper surface, such as the one corresponding to the control surface, and similarly the term "lower surface" can define only a part of the entire lower surface.

As the skilled person acknowledges, the construction of upper/lower surfaces also extends to other aircraft aerodynamic surfaces such as the VTP surfaces.

The term "airfoil" will be understood as the cross-sectional shape of an aerodynamic or lifting surface, said shape being determined so as to generate an aerodynamic force in the event of relative movement through a fluid, the component of said force perpendicular to the direction of motion being called lift.

Then, "an airfoil of an aerodynamic surface" is understood as a structural element of a lifting or aerodynamic surface of an aircraft in terms of "a portion of the aerodynamic surface". Accordingly, the sum of airfoils between two points measured spanwise on the aerodynamic surface results in another larger portion of the lifting or aerodynamic surface. Thus, the sum of airfoils throughout the entire span of the aerodynamic surface expresses the aerodynamic surface itself and, hence, in further embodiments, this portion of the aerodynamic surface may be the entire aerodynamic surface.

Therefore, the skilled person shall understand that for the continuous parts such as the leading edge, torsion box, spars, etc. that are mentioned herein in relation to an airfoil, it is meant to restrict its construction to the portion of these larger parts that are limited by the airfoil boundaries without prejudice that the sum of these portions may give rise to the complete parts.

Further in relation with the geometry of aerodynamic surfaces, the term "span" refers to the distance from the tip of the aerodynamic surface (e.g. the wingtip) to the root and, then, "spanwise" refers to "along/in the direction of the span".

Similarly, the term "chordwise" refers to a direction from the leading edge to the trailing edge, or vice versa, that is, "along/in the direction of the chord".

The term "leading edge" refers to the foremost edge of the lifting surface and thus, of the airfoil, as the aircraft moves forward.

The term "trailing edge" refers to the opposite edge respectively to the "leading edge" of the aerodynamic surface and thus, of the airfoil. Said trailing edge is located aft of the torsion box of the lifting surface and thus of the airfoil, as the aircraft moves forward.

"Aft" is referring to the back part of the lifting surface, sharing the same meaning as "rear" and contrasting with "forward", wherein a forward portion is closer to a cockpit of the aircraft than an aft or rear portion.

In this document, terms relating to "flexibility" or "flexible material" will be understood as a compliant material which has the ability to be elastically deformed when a force is applied and return to its original shape when said force ceases.

According to a first inventive aspect, the invention provides an airfoil of an aerodynamic surface, the airfoil comprising: a control surface comprising an upper surface and a lower surface, and a primary actuating means configured to elevate or lower the control surface, wherein at least a first portion of one of the upper surface and the lower surface of the control surface is auxetic with a negative Poisson ratio, and at least a second portion of the other of the upper surface and the lower surface of the control surface comprises a material with a Poisson ratio higher than the Poisson ratio of the first portion.

The control surface according to the invention comprises an upper surface and a lower surface. These surfaces form part of the upper and lower surfaces or skins of the entire airfoil thus rendering the surfaces of the entire airfoil into at least two parts, one part corresponding to or surrounding the control surface, and one or more additional parts corresponding to or surrounding portions of the airfoil other than the control surface.

According to the invention, the control surface may be located at and/or towards a trailing edge of the airfoil, at and/or towards a leading edge of the airfoil and/or at a portion of the airfoil between the leading edge and the trailing edge. The airfoil may comprise more than one control surface.

In an embodiment the control surface is located towards the trailing edge of the airfoil and the upper and lower surfaces of the entire airfoil comprise at least two parts, namely one part corresponding to or surrounding the leading edge and the torsion box (if present), and another part corresponding to or surrounding the control surface. In addition, in a further embodiment, there may be another part of the upper and lower surfaces or skins corresponding to a further control surface located towards the leading edge and/or at the leading edge (such as slats).

According to the invention, at least a first portion of one of the upper surface and the lower surface of the control surface is auxetic with a negative Poisson ratio, that is, this first portion has an auxetic structure and/or comprises an auxetic material thus allowing auxetic behavior of this portion of the upper surface or of the lower surface. For instance, applying a unidirectional tensile force in one of the directions contained on the surface results in an increase in size in that direction and also an increase in size in the perpendicular direction contained on the surface. On the other hand, applying a unidirectional compression force in one of the directions contained on the surface results in a decrease in size in that direction and also a decrease in size in the perpendicular direction contained on the surface. In both cases, the first portion recovers its original shape when the force application ceases. The first portion and the forces applied to the first portion, in normal use of the aircraft, are thus adapted to create an elastic deformation of the first portion and not a plastic deformation of the first portion.

Poisson ratios for auxetic materials can be as low as or close to −1 (minus one). In that case, the reduction or increase in size on the transverse direction is of the same magnitude as in the direction were the load is applied.

In an airfoil according to the invention, at least a second portion of the other of the upper surface and the lower surface of the control surface comprises a material having a Poisson ratio higher than the Poisson ratio of the first portion, thus providing deformation of the overall airfoil section. Said deformation is the result of the different Poisson ratios of the first and second portion, which generates a transversal reaction of different magnitude in said first and second portions of the airfoil, thus leading to an unequal variation of lengths in the upper and the lower surface of the control surface and to a deformation of the overall airfoil section.

In some embodiments, said second portion may be made of a conventional material, also identified hereinafter as a non-auxetic material, with a positive Poisson ratio. Compared to the first portion, said second portion made of conventional material presents the opposite characteristic: applying a unidirectional tensile force in one of the directions contained on the surface results in an increase in size in that direction and also a decrease in size in a perpendicular direction contained on the surface. On the other hand, applying a unidirectional compression force in one of the directions contained on the surface results in a decrease in size in that direction and also an increase of size in a perpendicular direction contained on the surface. Examples of conventional materials may be a composite laminate, metals such as aluminium alloy, a honeycomb sandwich structure design, the truss structure design, etc.

In other embodiments, the second portion may have a negative Poisson ratio, higher than the Poisson ratio of the first portion, i.e. the second portion has a negative Poisson ratio with a smaller absolute value (including zero) than the first portion, thus showing a weaker auxetic behavior.

In some embodiments, the other of the upper surface and the lower surface of the control surface is made of a material having a Poisson ratio higher than the Poisson ratio of the first portion. That is, that entire surface is made with said conventional material or with a material showing a weaker auxetic behavior.

The combination of the first portion on any of the upper or lower surfaces and the second portion on the opposite surface of the control surface also facilitates the deployment of said control surface while reducing secondary induced-stresses thereon.

Advantageously, the combination of auxetic and conventional materials/auxetic materials with a higher Poisson ratio on opposite surfaces of the control surface allows to actuate said control surface spanwise and chordwise.

Advantageously, and unlike conventional materials, in use, an auxetic material reduces the risk of suffering from buckling of the shells or panels forming the aerodynamic surface allowing the aerodynamic surface to undertake its main function of lift boosting without the penalties of excessive loss of stiffness observed in the use of conventional materials under compression loads. Consequently, the singular structural properties of the first portion, which makes it to deform, as explained previously, contrary to the way conventional materials deform under the application of external loads result in more flexible shells elements, whose deformation upon external loads better adapts to and follows the curvature of the aerodynamic surface.

That is, the first portion allows to transform a single compression or a single traction force applied on the trailing edge into a combination of compression and traction stresses on said surface, making it less sensitive to buckling and thus resulting in a more effective and balanced distribution of forces.

Furthermore, the combination of the first portion of auxetic material on one surface and the second portion on the opposite surface, wherein the second portion is made of conventional material/auxetic material with a higher Poisson ratio enables a differentiated displacement chordwise that can facilitate the shape changing of the aerodynamic surface, for example to increase its camber.

Regarding the control surface, a primary actuating means is configured to elevate or lower said control surface and provide ability to adapt to take-off, in-flight and landing conditions following the forces and strains applied on said airfoil.

In an embodiment, the upper surface and the lower surface of the control surface are continuous with the remainder upper surface or lower surface of the airfoil. In an embodiment, the portion comprising the auxetic material forms a continuous upper surface or lower surface with the remainder upper surface or lower surface that, in preference, is made of conventional material with a positive Poisson ratio.

Advantageously, the continuity between auxetic material and non-auxetic material of the upper and/or lower surface provides a continuous extrados and/or intrados from the leading edge to the trailing edge. This allows to provide skin continuity of the aerodynamic surface, avoiding any steps and gaps associated to the interface between control surfaces and rigid fairings as may be found on conventional airfoils, said steps and gaps having important impact on drag.

Thus, having dispensed with former gaps and steps, the wet area of the airfoil is increased and the actuation of the control surface is improved. Also, it avoids side-effects and allows delaying flow separation.

In an embodiment, the airfoil comprises a torsion box comprising an upper skin, a lower skin, a rear spar and a front spar. That is, in this embodiment, the airfoil comprises a leading edge, a torsion box, a control surface and a trailing edge. In particular, the torsion box comprises a front spar and a rear spar. The leading edge may be secured to at least the front spar of the torsion box ahead thereof. Therefore, the torsion box is located between the leading edge and the trailing edge.

In an embodiment the control surface is located aft of said rear spar, and the first portion extends up to the rear spar such that said first portion bridges: the upper skin of the torsion box and the upper surface of the control surface; or the lower skin of the torsion box and the lower surface of the control surface; providing aerodynamic continuity thereby.

In an embodiment the control surface is located fore of the front spar, and the first portion extends up to the front spar such that said first portion bridges: the upper skin of the torsion box and the upper surface of the control surface; or the lower skin of the torsion box and the lower surface of the control surface; providing aerodynamic continuity thereby.

The airfoil may comprise more than one control surface according to the invention, such as a first control surface located aft of the rear spar and a second control surface located fore of the front spar.

In an embodiment, wherein the control surface is located aft of the rear spar, said rear spar is located at around 50% of the chord length of the airfoil, wherein 0% of the chord length corresponds to the position of the leading edge and 100% of the chord length corresponds to the position of the trailing edge. In an embodiment, the first portion extends at least from 50 to 75% of the chord length.

Unlike prior art, where hinge lines for control surface deployment are located at 75% chord length, thus rendering the forepart of rigid fairings non-movable, the present embodiment covers that area with the first portion (i.e., with auxetic material), increasing the lifting capabilities of the airfoil. In other words, instead of having a rigid fairing covering 25% chord length to house the actuating means, it is replaced by the first portion and provides a continuous and progressive deployment of the control surface avoiding any abrupt profile.

In an embodiment, the first portion extends from 50% the chord length to 100% the chord length. Advantageously, in this embodiment the upper or lower surface of the airfoil is auxetic along 50% of the entire chord and provides a more effective distribution of forces, as well as higher curvatures of the control surfaces if needed.

In an embodiment, the first portion comprises a flexible grid structure covered by a flexible skin.

A material is considered auxetic if its Poisson ratio is negative. The first portion of the present embodiment may have a re-entrant hexagonal geometry, that is, a hexagonal design with a negative angle. In particular a re-entrant hexagonal geometry shows, between consecutive lateral sides, four identical angles of less than 90 degrees and two identical angles of more than 90 degrees. By adjusting such angles, the auxetic behavior of such geometry can be tuned-up as desired.

In an embodiment, the flexible grid structure is formed by rigid segments joined together by means of flexible junctions or joints (i.e., allowing rotation) at the intersections of said rigid segments. Thus, interconnected rigid segments can rotate with respect to each other around the junction points giving rise to a stretched condition behaving as an auxetic material.

In an embodiment, the first portion is assembled together with a non-auxetic portion. Furthermore, said union can be made by mechanical means such as rivets or bounding or co-curing.

For instance, any of the surfaces may be formed by a rigid grid with a conventional hexagonal design (e.g. as a conventional honeycomb) that changes its pattern to a re-entrant hexagonal design at certain length for giving rise to the first portion with auxetic behavior. Therefore, advantageously, the flexible skin may cover the boundary between the first portion and the non-auxetic portion entailing a progressive and continuous profile.

The resulting flexible grid structure is covered by a flexible skin material such as flexible resin or rubber-like skin assembled together by a mechanical joint such as an adhesive or by bonding or by co-curing.

Advantageously, the combination of the grid structure and its flexible skin allows the auxetic material to deform and cover the vacancies which assure air tightening in order to form an optimal aerodynamic skin surface.

An additional advantage of this embodiment, which combines rigid grids with conventional patterns and auxetic patterns, is that the manufacture of these patterns can be included directly in additive manufacturing processes. Eventually, the manufacture of the flexible skin that covers said patterns can also be included in said additive manufacturing processes. These additive manufacturing processes previously mentioned may include the generation of the auxetic and non-auxetic parts of the control surface or of the entire aerodynamic surface. Advantageously, these parts and even the entire aerodynamic surface may be manufactured in one shot, therefore reducing the cost and time to perform the assembly of the different elements.

Additionally, the portion of the skins covering the rigid grid can also be rigid (and not flexible material), to increase the strength of the portions where flexible skin is not required.

In another embodiment, each first portion and/or non-auxetic portion is made of continuous material without joints, which allows a continuous and quicker manufacturing step. Said continuous material without joints may be a composite material having geometry changes or including voids in its structure.

Similarly, in this embodiment with continuous material without joints, as in the case of combination of grids and flexible skin, it is also suitable to implement an additive manufacturing process to reduce the lead time cost of the assembly process.

In an embodiment, the first portion comprises at least one of the following: continuous fiber laminate embedded in resin material forming reinforced plastic with tetraskel structures, foam material with cavities with macro-scale continuity and micro-scale voids, graphene material with vacancy defects, and crystalline materials with a negative homogeneous Poisson ratio.

In an embodiment, the auxetic behavior of the first portion is obtained by orienting continuous fiber laminate embedded on resin material forming reinforced plastic with tetraskel structures.

In another embodiment, the auxetic behavior of the first portion is obtained by a foam material with cavities having macro-scale continuity and micro-scale voids.

In another embodiment, the auxetic behavior is achieved at micro scale with graphene material having vacancy defects implemented on zones that have been previously identified as needing to be auxetic.

In a further embodiment, the first portion can be made of materials that naturally exhibit an auxetic behavior such as a-Cristobalite, rocks or minerals having negative Poisson properties at micro or nano-scale.

In an embodiment the primary actuating means comprises at least one first actuator configured to exert a force on the control surface essentially along the spanwise direction, which makes the first portion to deform essentially along the chordwise direction.

In an embodiment wherein the airfoil comprises a torsion box with a rear spar, wherein the first portion extends up to the rear spar, the primary actuating means comprises a first swiveling rod secured at a first end to the rear spar by means of a rotary junction and, at a second end, opposite to the first end, secured by means of a rotary junction to an inner face of the control surface adjacent to the surface comprising the first portion.

In an embodiment, the rotary junction by means of which the first swiveling rod is secured to the rear spar is located proximate to the junction between the rear spar and the surface opposite to the surface comprising the first portion.

According to this embodiment, the first swiveling rod and the first portion form a triangle shape, so that when the first portion deforms, the second end of the first swiveling rod is constrained to move around a circumference which center is located on the first end of the first swiveling rod, and the rear rigid movable surface (i.e., the aerodynamic structure of the control surface which is not formed by auxetic material) describes the desired rotation movement. Due to the triangle shape, the primary actuating means is able to assure the required deformation of the movable control surface and to support the vertical loads resulting from the aerodynamic forces, with a minimum amount of swiveling rods.

Compared to the conventional movable of, e.g. an empennage or a wing, this embodiment provides significant advantages since, as stated previously, only one swiveling rod is needed, unlike control surfaces of the state of the art, which need two swiveling rods to give rise to the triangular articulated hinging structure. Furthermore, the dedicated extensible actuator of the state of the art is also removed. Additionally the rotating point of the movable is located forward (i.e., with respect to the leading edge of the airfoil) compared to a conventional system. In particular, the first portion (i.e., auxetic portion) bridging the rigid structure of the torsion box, and the rigid movable surface of the control surface is located forward than the actuating point of conventional dedicated extensible linear actuators secured to an internal face of the rigid movable part for deflecting the control surface. Advantageously, a greater surface (i.e., wet area) with an improved aerodynamic continuity is deformed (i.e., deflected) compared to conventional control surfaces with rigid fairings, thus rendering control surface, more effective.

In an embodiment wherein the airfoil comprises a torsion box with a front spar, wherein the first portion extends up to the front spar, the primary actuating means comprises a first swiveling rod secured at a first end to the front spar by means of a rotary junction and, at a second end, opposite to the first end, secured by means of a rotary junction to an inner face of the control surface adjacent to the surface comprising the first portion.

In an embodiment, the rotary junction by means of which the first swiveling rod is secured to the front spar is located proximate to the junction between the front spar and the surface opposite to the surface comprising the first portion.

In an embodiment, the primary actuating means may comprise more than one swiveling rods for improving the control surface deployment. In this way, rigidity is enhanced and the control of the deployment may be increased.

In an embodiment the primary actuating means comprises a second swiveling rod secured at a first end to the rear spar or the front spar by means of a rotary junction adjacent to the rotary junction of the first swiveling rod and, at a second end, opposite to the first end, secured by means of a rotary junction to an inner face of the control surface adjacent to the surface opposite to the surface comprising the first portion.

In an embodiment, the at least one first actuator is embedded within the first portion and disposed essentially along the chordwise direction.

In an embodiment, the at least one first actuator is embedded within the first portion and disposed essentially along the spanwise direction.

In an embodiment, the primary actuating means comprise at least one second actuator embedded within the second portion and disposed essentially along the chordwise direction.

In an embodiment, the primary actuating means comprise at least one second actuator embedded within the second portion and disposed essentially along the spanwise direction.

In an embodiment, the at least one embedded first and/or second actuators are one of the following: piezo-electric actuator, memory shape material such as metallic alloys or polymers activated by electrical energy, thermal actuator, or magnetic actuator.

Advantageously, actuators embedded within the lower and/or upper surface (i.e., the first and/or second portion) of the control surface cause the extension of one surface and the compression—or an extension to a lesser degree—of the opposite surface simultaneously. Additionally, embedding the actuator(s) entails a continuous distribution of forces and strains along the aerodynamic surface and as a result provides a uniform and precise deformation shape that improves the efficiency and actuation performance of the control surface.

In an embodiment, the primary actuating means comprises an electric actuator which produces an expansion or retraction on the control surface that implies movement to said control surface when respectively a positive or negative voltage is applied through the electric actuator.

Electric actuators may be piezo-electric or memory shape material such as metallic alloys or polymers activated by electrical energy, disposed either continuously or at distributed pitch.

In an embodiment, the at least one first actuator is one among: a pneumatic, hydraulic, electric or hybrid extensible rod fixedly secured at a first end to the rear spar or the front spar and, at a second end, opposite to the first end, fixedly secured to the inner face of the control surface corresponding to the surface comprising the first portion.

In an embodiment, the at least one first actuator is one among: a pneumatic, hydraulic, electric or hybrid extensible swiveling rod secured by means of a rotary junction at one end to the rear spar or the front spar and, at the opposite end, secured by means of a rotary junction to the inner face of the control surface corresponding to the surface comprising the first portion.

In an embodiment, any of the above defined rods is extensible and comprises a dedicated actuator configured to control its extension.

In an embodiment, the primary actuating means comprises a plate, preferably a rib, arranged chordwise and securely attached to the first portion and the second portion, the plate being adapted to be actuated by a force in the spanwise direction which tends to displace the plate, the plate thus transferring a compression or traction load to the first and second portions.

In an embodiment, the control surface further comprises, at the trailing edge, a control tab and a secondary actuating means configured to elevate or lower the control tab.

In aeronautics, a tab is configured to rotate in the opposite direction to the rest of the movable control surface and produces an opposite load. The moment generated compensates the moment of the rest of the elevator, reducing the resistance of the entire movable part to be deployed. Thus, collaterally, this tab alleviates the action of the primary actuating means for the entire control surface deployment.

Since the tab is located far away from the torsion box, it typically comprises large level arms extending through high distance and, therefore, even for a much lower load produced, the magnitude of the moment produced is typically comparable to the primary actuating means.

In an embodiment, the secondary actuating means comprises an actuator and a level arm mechanism.

In an alternative embodiment, the upper surface or lower surface of the tab is auxetic and provides the same characteristics above mentioned for the first portion.

Advantageously, unlike the complex mechanism that requires further space allocation between the rear spar and the movable extending to the tab, the upper surface or lower surface of the tab being auxetic allows for remote actuation or simpler actuating means, as explained, without the need for long arms or further dedicated actuators.

Advantageously, having auxetic material on one surface of the control tab allows the entire control surface, e.g. from 50% of the chord length to 100% of the chord length, to better control the deployed profile while reducing drag.

In an embodiment, the auxetic surface of the tab is located on the same side (upper or lower surface) as the first portion and is arranged as a continuation of said first portion. Furthermore, the tab is designed to generate additional deformation of the movable in the same direction increasing the curvature of the whole movable and increasing the aerodynamic force which the movable can generate.

In an embodiment, the auxetic surface of the tab is located on the side (upper or lower surface) opposite to the surface containing the first portion. Furthermore, the tab is designed to generate additional deformation of the movable in the opposite direction reducing the curvature of the movable as a whole and providing a load alleviation effect.

In a particular embodiment, the control surface comprises a plurality of cellular inflatable elements housed between the upper surface and the lower surface, and the primary actuating means are configured to selectively inflate or deflate the cellular inflatable elements, such that when the cellular inflatable elements are inflated, at least one of the cellular inflatable elements expand from within an inner volume of the control surface exerting a spanwise force that induces a deformation of the first and/or second portion in the chordwise direction.

On the contrary, when a reduction of pressure is applied to the inflatable cellular elements, said inflatable cellular elements retract along the span of the airfoil. This retraction induces a chordwise retraction of the first portion and deflects the control surface towards the opposite direction.

Inflatable cellular elements can occupy a portion of the internal volume of the control surface. Preferably, inflatable cellular elements are provided between the lower and upper surfaces. In a particular embodiment, inflatable cellular elements are provided over the entire inner volume of the control surface.

The cellular inflatable elements can be formed by woven or braided high strength fiber cover or impregnate on elastic material or resin as rubber or similar material.

In an embodiment, the inflatable cellular elements can be embodied as a cellular skin provided with a patterned shape that does not tend to become cylindrical due to the pressure, but to adopt a desired profiled volume when inflated. In an embodiment, this is achieved by means of so called drop stitched woven or 3D woven, in which some fibers join one side of the cellular skin to the other side. These fibers are able, when in tension, to sustain the load from the pressure along their direction, thus maintaining a maximum distance between the opposite skins of the cellule and ensuring that the inflatable elements do not apply pressure against the upper surface and the lower surface.

In this embodiment, the primary actuating means is preferably a pneumatic actuator with one or more drop stitch inflatable elements.

In a second inventive aspect, the invention also provides an aerodynamic surface comprising at least one airfoil according to any of the embodiments of the first inventive aspect.

In an embodiment, the aerodynamic surface comprises a plurality of airfoils according to the first inventive aspect.

In an embodiment, the aerodynamic surface has a control surface comprising an upper or lower surface with a continuous first strip with negative Poisson ratio extending spanwise, preferably extending substantially from the root to the tip.

That is, the first portion of each airfoil forming the aerodynamic surface is next to the first portions of adjacent airfoils so that the set of first portions forms a continuous auxetic first strip spanwise. Preferably, all the first portions are extended from the same percentage of the chord length.

Thanks to the tuneable first portions, the control surface may be gradually deployed as desired forming waves, steps, etc. throughout the span.

Preferably, the surface opposite to the surface comprising the first strip comprises a continuous second strip comprising a material with a Poisson ratio higher than the Poisson ratio of the first strip.

In an embodiment, the aerodynamic surface has a control surface comprising an upper or lower surface with a continuous strip comprising alternating portions of material with negative Poisson ratio and higher Poisson ratio spanwise.

Said alternation of auxetic material and conventional material/auxetic materials with a higher Poisson ratio results in multiple strips alternating spanwise and chordwise.

Advantageously, this allows to separate the deployment of certain control surfaces to accomplish an effective flight control.

For instance, as specified in the background, there are some control surfaces intended to be used in flight attitude while others are meant for lift boosting. Thus, they will be used at different phases of the flight enabling separate control over them for safety reasons.

Furthermore, the combination of auxetic portions and conventional/auxetic materials with a higher Poisson ratio portions contributes to compensate the spanwise deformation caused by the tension and compression of the skins chordwise, and thus reduce the secondary stresses at the interfaces between said auxetic and conventional/auxetic materials with a higher Poisson ratio portions.

In an embodiment, the aerodynamic surface comprises actuating means disposed spanwise and configured for applying a force in the spanwise direction to at least one strip comprising material with negative Poisson ratio, such that said strip is deformed in the chordwise direction thereby.

The actuators may be also distributed throughout the span and act locally only on a portion of the aerodynamic surface (i.e. a few airfoils), or act globally on the deployment of the whole control surface, or may be actuated from the fuselage.

That is, thanks to the ability of the auxetic portion to deform 'inwards' or 'outwards' on-plane, the fact of pulling or pushing spanwise the first portion at one of its ends, for example on the fuselage side, provokes the deformation chordwise of the first portion which may result in a deployment of the control surface if compensated by the other surface made of conventional material or auxetic material with a higher Poisson ratio.

Advantageously, this allows a single actuating means configured for applying a force in the spanwise direction to at least one strip comprising material with negative Poisson ratio throughout airfoils to actuate on the entire control surface of an aerodynamic surface. Also, this particular embodiment, wherein the control surfaces can be actuated by means of actuating means located within the aircraft fuselage and configured for applying a force in the spanwise direction to said strip, allows to exert centralized control (i.e., from the single actuating means located within the aircraft fuselage) over the two aerodynamic surfaces disposed at opposite sides of the vertical plane of the aircraft, such as the two HTP elevator or wing movables from each side, instead of implementing different dedicated and distributed actuation systems on each sides as in the state of the art.

In an embodiment the primary actuating means of the airfoil comprises a plate, preferably a rib, arranged chordwise and securely attached to the first portion and the second portion, the plate being adapted to be actuated by a force in the spanwise direction which tends to displace the plate, the plate thus transferring a compression or traction load to the first and second portions, and the actuating means of the aerodynamic surface comprises a bar connected to the plate. The actuating means of the aerodynamic surface further comprises at least one of: pneumatic, hydraulic, electric or hybrid actuator configured to drive the bar in the spanwise direction, such that the bar is configured to apply a force on the plate in the spanwise direction which tends to displace the plate, the plate thus transferring a compression or traction load to the first and second strip.

In a third inventive aspect, the invention provides an aircraft comprising at least one aerodynamic surface according to any of the embodiments of the second inventive aspect.

In a particular embodiment, the actuating means configured for applying a force in the spanwise direction are adapted to be operable by pneumatic, hydraulic, electric or hybrid actuators located within the aircraft fuselage.

All the features described in this specification, including the claims, description and drawings, can be combined in any combination, with the exception of combinations of such mutually exclusive features.

SUMMARY OF THE DRAWINGS

These and other features and advantages of the invention will be seen more clearly from the following detailed description of a preferred embodiment provided only by way of illustrative and non-limiting example in reference to the attached drawings.

DETAILED DESCRIPTION

As will be appreciated by one skilled in the art, aspects of the present invention may be embodied as an airfoil (1), an aerodynamic surface (10) or an aircraft.

Figure 1A:
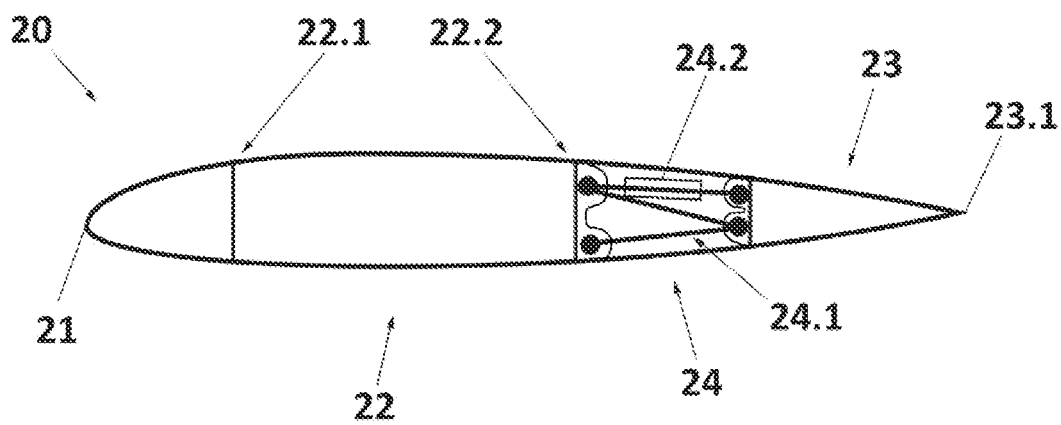
FIGS. 1a to 1c show schematic representations of conventional airfoils according to the prior art.

FIG. 1a depicts an airfoil (20) comprising a leading edge (21), a torsion box (22) with a front spar (22.1) and a rear spar (22.2), and a control surface (23) close to the trailing edge (23.1) of the airfoil (20).

In particular, it is seen that the leading edge (21) is located at the front (0%) of a chord of the airfoil, the front spar (22.1) is located at around 15% of the chord length, and the torsion box (22) extends up to around 50% the chord length, where the rear spar (22.2) is located. Backwards, the control surface (23) extends between around 75% the chord length to 100% the chord length, wherein 100% the chord length corresponds to the trailing edge (23.1).

As it can be observed, the space between the rear spar (22.2) and the beginning of the control surface (23), e.g. from around 50 to 75% the chord length, houses the actuating means (24) configured to elevate and lower the control surface (23). Typically, this space is covered by rigid aerodynamic fairings (24.3) with a free edge (e.g. at around 75% the chord length) for allowing the control surface to rotate upwards and downwards around a hinge axis (see FIGS. 1b and 1c).

The control surface (23) reproduces a rigid structure that can move. Thus, a step is normally present between the free edge of the rigid aerodynamic fairings (24.3) housing the actuating means (24) and the movable control surface (23) itself.

Figure 1B:
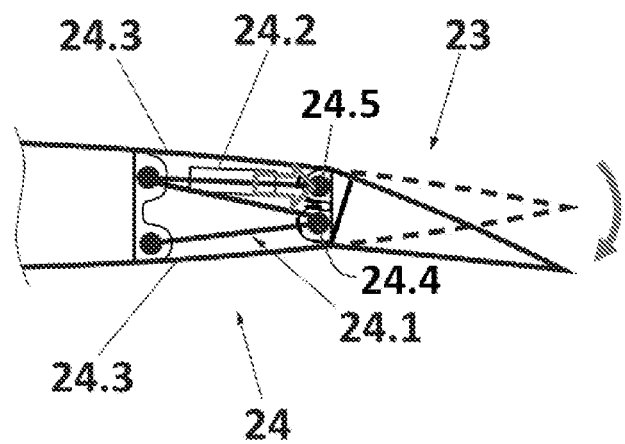
Figure 1C:
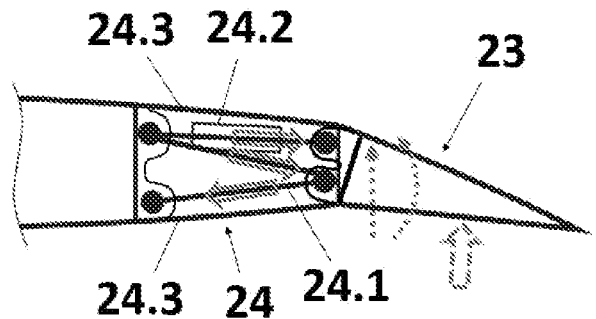

According to FIGS. 1b and 1c, the movable control surface (23) is actuated upwards or downwards (only downward movement is shown) by the actuating means (24) which comprise swiveling rods (24.1) actuated by a hydraulic, electrical or hybrid dedicated actuator (24.2).

As it can be seen in FIG. 1b, the control surface (23) is attached at a first attaching point (24.4) by a hinge axis that is fixed to the torsion box by means of two swiveling rods (24.1). In some cases the hinge axis can be fixed to the torsion box by means of a fitting instead of two swiveling rods (24.1).

More in particular, with respect to the operation of the conventional airfoil architecture shown, it can be seen that the movable control surface (23) is also attached to a second attaching point (24.5), by means of an additional swiveling rod with the actuator (24.2), the second attaching point (24.5) being separated from the first attaching point (24.4) by a vertical offset. The swiveling rod with an actuator (24.2) is also attached to the torsion box. In FIG. 1c, the forces exerted by the actuator (24.2) are schematically depicted by a solid arrow showing an example of operation wherein the actuator expands axially a certain length to push the second attaching point (24.5) to a position away from the torsion box. The subsequent downward rotation movement of the movable control surface (23) is shown in FIG. 1b, as the movable control surface (23) changes from the un-deflected position represented with dotted line to the deflected position represented with solid line. Therefore, the actuator (24.2) is able to expand and contract, on a controlled manner, generating a force tending to push away from the torsion box/pull closer to the torsion box the second attaching point (24.5), in the chordwise direction, producing a rotation of the movable control surface (23) around the hinge axis of the first attaching point (24.4) due to the mentioned vertical offset between the two attaching points (24.4, 24.5) of the movable control surface (23). The hinge axis is normal to the cross section plane of the airfoil.

FIG. 1c also depicts the boosting aerodynamic lifting forces with dotted arrow close to the trailing edge. Those boosting aerodynamic lifting forces generate a resulting bending moment and shear load transmitted to those attaching points (24.4, 24.5). Additionally, the solid arrows located at the swiveling rods (24.1) depict the reactions that are produced to counteract those aerodynamic forces, on the represented conventional actuating means (24) of the control surface (23).

Since the rigid fairings (24.3) are not deformable, the deflection of the movable control surface (23) is limited, producing abrupt profile transition (undesirable parasitic drag even in no-deployment state).

FIGS. 1a to 1c represent a simple airfoil architecture with a single rotational control surface that is typically used on conventional empennages as for example on horizontal and vertical tail planes. In that case, the movement of the control surface (23) is only rotational without translation.

Figure 2A:
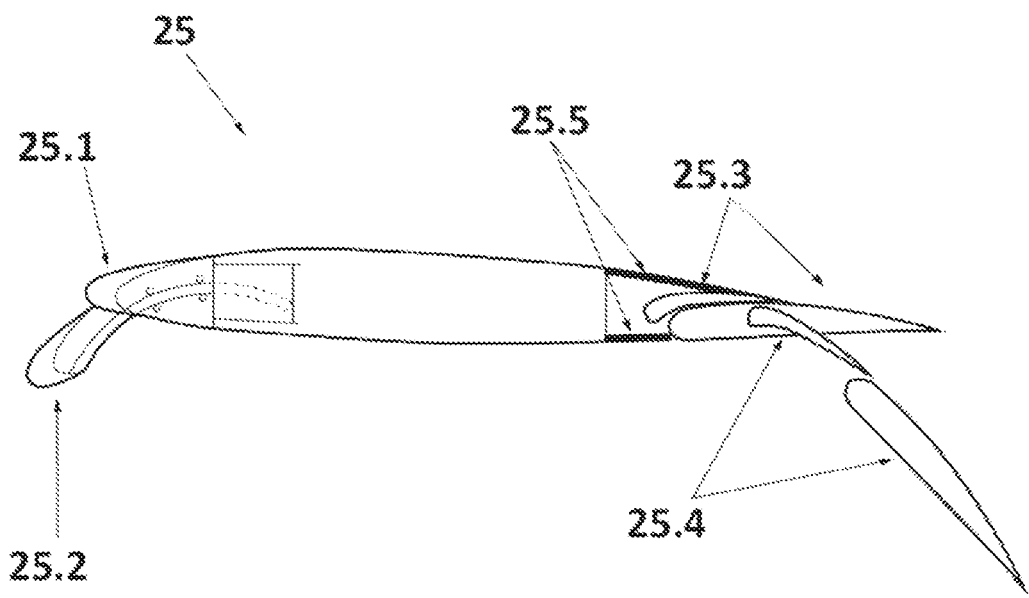
FIGS. 2a and 2b show schematic representations of conventional airfoils according to the prior art.

FIG. 2a represents a more complex airfoil (25) of large passenger aircraft wings. It can be seen that the movable control surface can be installed both on the leading edge, (called slat (25.1)) and on the trailing edge (called flaps (25.3)). Also, it can be seen that the movable control surfaces (25.1, 25.4) can be composed of several movable surfaces to increase airfoil movable deflection as it is represented for the slat, shown in closed position (25.1) and in deployed position (25.2), or for the flap, also shown in closed position (25.3) and in deployed position (25.4). In the case of the wing, both the flaps and slats can describe not only rotation around a single axis but also translation movement.

As schematically shown, in these cases the rigid fairings (25.5) are not able to cover the gaps and steps produced by the movement of the control surfaces, thus increasing the drag and affecting significantly the efficiency of the aerodynamic surface.

Figure 2B:
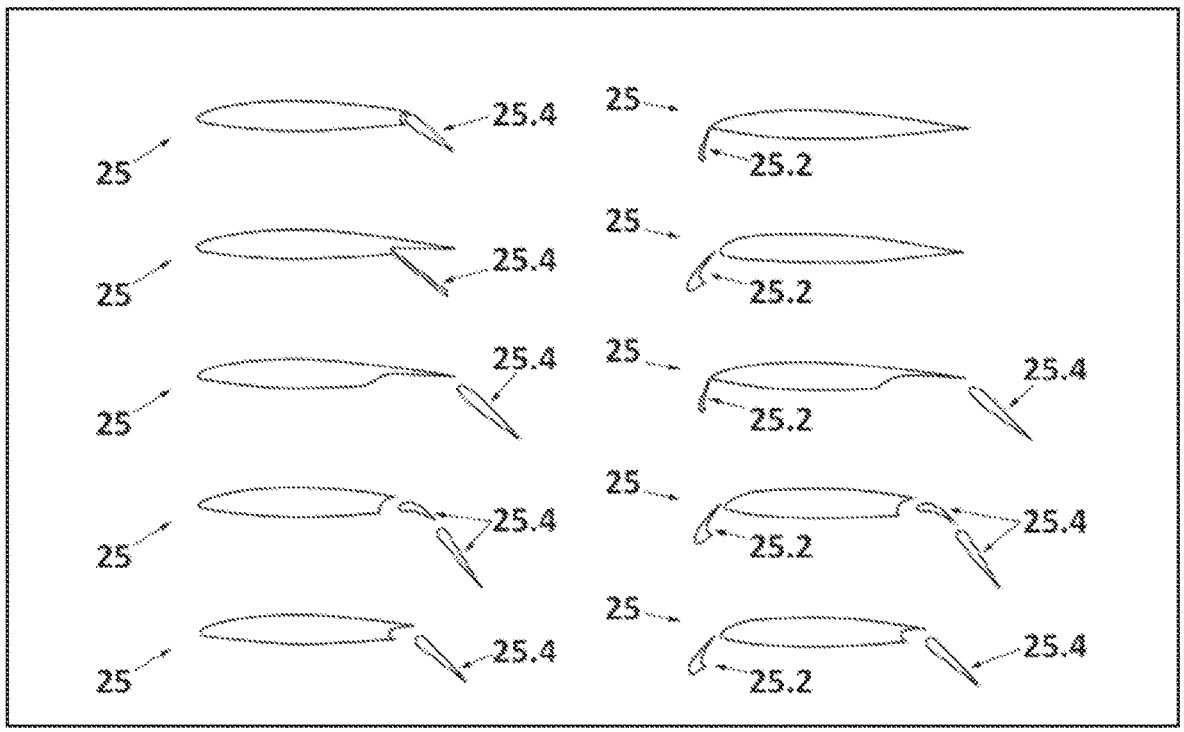

FIG. 2b represents other movable control surfaces (25.2, 25.4) examples located on the trailing and leading edge of airfoils (25). In all cases, it can be seen that non-desirable steps and gaps and abrupt profile transitions are presented, due to the non-deformable movable control surface and rigid aerodynamic fairing.

Figure 3:
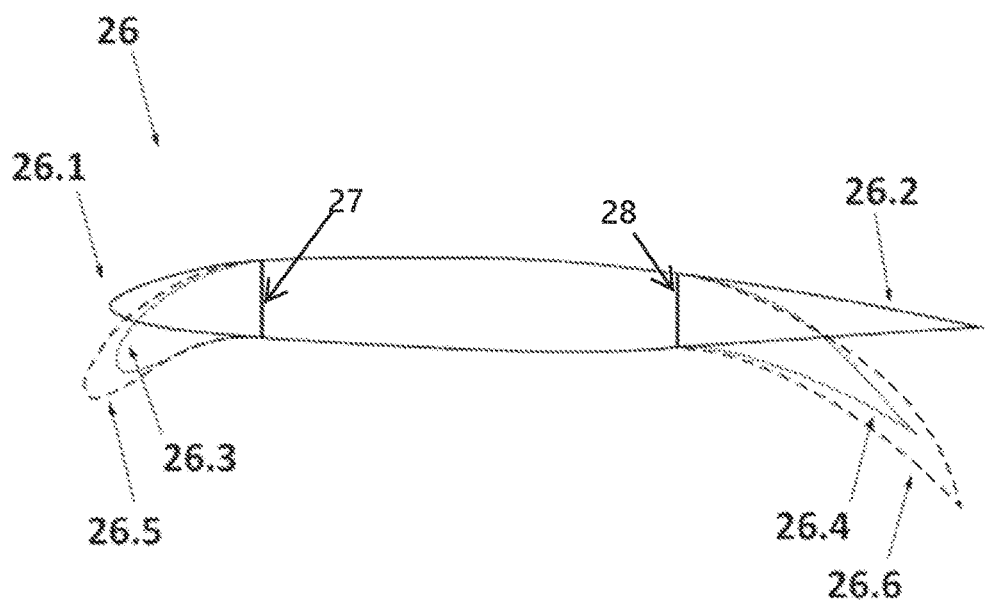
FIG. 3 shows an ideal airfoil.

FIG. 3 depicts a schematic representation of an ideal concept for an airfoil comprising a control surface, in which the external surface of the airfoil (26) can deform in a progressive controlled and elastic manner till reaching the optimal shape needed for each flight conditions. The leading edge (26.1) which extends forward of a front spar (27) and the trailing edge (26.2) which extends rearward of a rear spar (28). The leading edge (26.1) and the trailing edge (26.2) are able to change their curvature or camber and, additionally, their chord length.

Non-deformed shapes are represented by solid lines on the leading edge (26.1) and trailing edge (26.2). Deformed shapes (26.3 and 26.4 respectively), only changing the curvature of the leading edge (26.1) and trailing edge (26.2), are represented by dotted line. Additional alternative deformed shape (26.5 and 26.6 respectively), changing both the curvature and the chord length of the leading edge (26.1) and trailing edge (26.2), are represented by dashed line.

The airfoil (26) of the FIG. 3 shows deformable surfaces, also called morphing surfaces, which are able to deform in a continuous manner without steps and gaps between the fixed and movable parts and without abrupt profile transitions providing significant aerodynamic performance improvements.

Figure 4A:
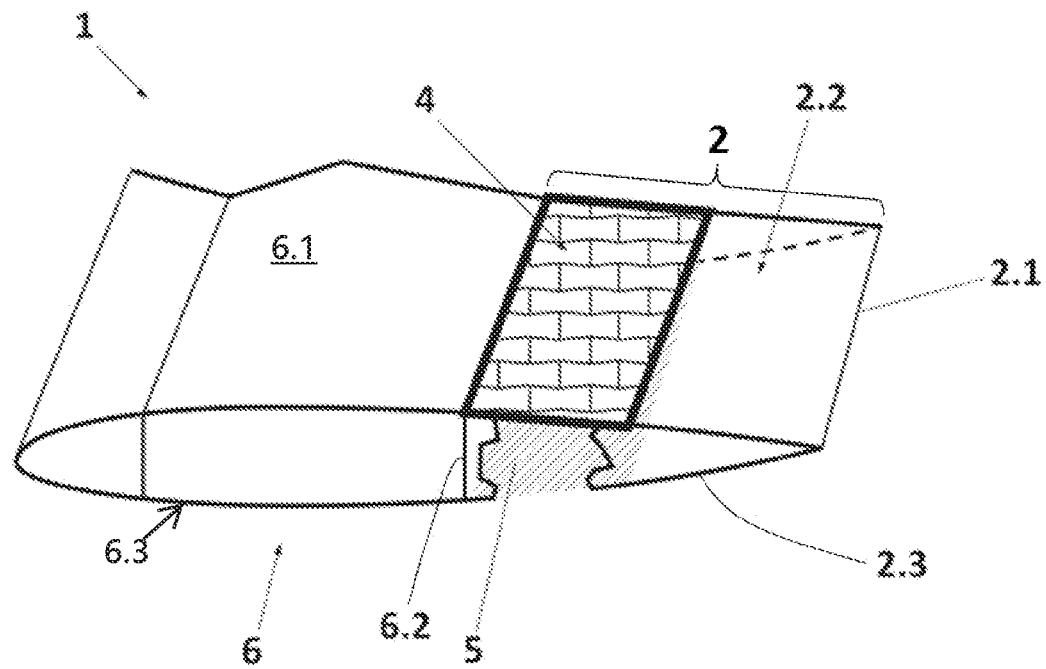
FIGS. 4a to 4e show schematic representations of an airfoil according to an embodiment of the present invention, as well as a representation of the deformations occurred at upper and lower surfaces thereof.
Figure 4B:
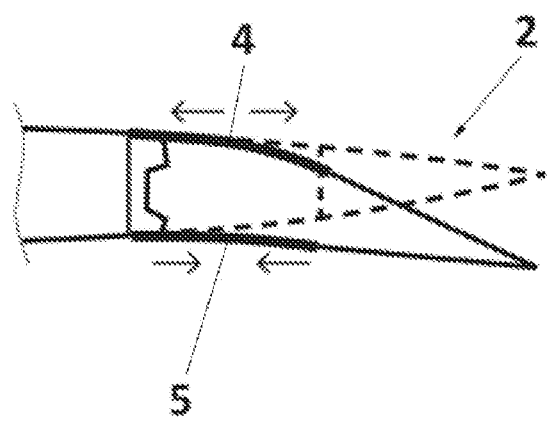
Figure 4C:
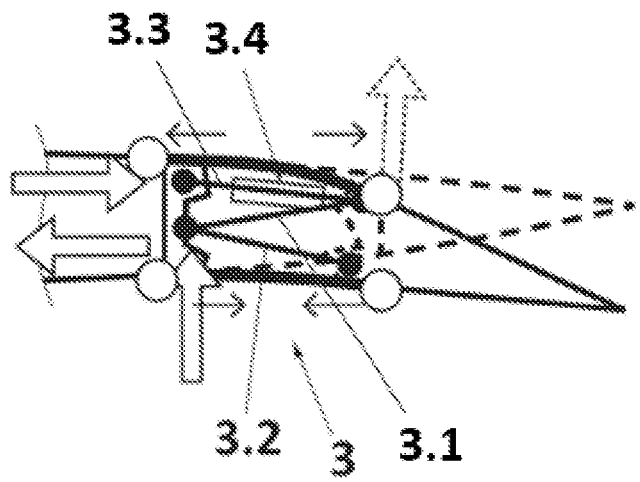

FIGS. 4a to 4c depict an airfoil (1) or a portion of an aerodynamic surface according to an embodiment of the invention. The airfoil (1) comprises a control surface (2) at a trailing edge (2.1) and comprising an upper surface (2.2) and a lower surface (2.3), and a primary actuating means (3) configured to deflect upward or downward the control surface (2).

According to the invention, a first portion (4) of one of the upper surface (2.2) and the lower surface (2.3) of the control surface (2) is auxetic with a negative Poisson ratio, and a second portion (5) of the other of the upper surface (2.2) and the lower surface (2.3) of the control surface (2) has a higher Poisson ratio.

In the embodiment of FIGS. 4a-4c, the airfoil (1) comprises a torsion box (6) comprising an upper skin (6.1), a lower skin (6.3) and a rear spar (6.2), the control surface (2) being located aft of said rear spar (6.2). The first portion (4) extends up to the rear spar (6.2) such that said first portion (4) bridges the upper skin (6.1) of the torsion box (6) and the upper surface (2.2) of the control surface (2), or the lower skin (6.3) of the torsion box (6) and the lower surface (2.3) of the control surface (2), providing aerodynamic continuity thereby.

As it can be observed, in this embodiment the first portion (4) is located aft of the rear spar (6.2) (e.g. at approximately 50% the chord length of the airfoil (1)) up to a predetermined location (e.g. approximately 75% the chord length), bridging the upper skin (6.1) of the torsion box (6) and the upper surface (2.2) of the control surface (2), such that no gap is present and aerodynamic continuity is provided.

Accordingly, in the embodiment of FIGS. 4a to 4c the auxetic first portion (4) is part of the upper surface (2.2) and the second portion (5) is part of the lower surface (2.3) of the control surface (2). The first portion (4) provides a higher angle of deflection to the entire control surface (2). In addition, the first portion (4) of the upper surface (2.2) is continuous with the remainder upper surface of the airfoil (1).

FIGS. 4b and 4c depict a detailed view of an airfoil (1) according to the embodiment of FIG. 4a. Both figures show the ability of the airfoil (1) to deflect (downward in the particular example of operation shown) and provide a greater deflection of the control surface (2) compared to the achieved deflection shown on FIGS. 1b and 1c in the state of the art. As schematically depicted by the dotted arrow in FIG. 4c, a greater wet area of the control surface causes a higher lift boosting.

In this embodiment, the primary actuating means (3) comprises a first actuator (3.4) configured to exert a force on the control surface (2) essentially along the chordwise direction, and a first swiveling rod (3.1) secured at a first end to the rear spar (6.2) by means of a rotary junction and secured at a second end, by means of a rotary junction, to an inner face of the control surface (2) adjacent to the upper surface (2.2). The primary actuating means (3) further comprises a second swiveling rod (3.2) secured at a first end to the rear spar (6.2) by means of a rotary junction adjacent to the rotary junction of the first swiveling rod (3.1) and, at a second end, secured by means of a rotary junction to an inner face of the control surface (2) adjacent to the lower surface (2.3). The primary actuating means (3) also comprises an actuator (3.4) in the shape of an extensible swiveling rod (3.4) secured at a first end to the rear spar (6.2) by means of a rotary junction and secured at a second end, by means of a rotary junction, to an inner face of the control surface (2) adjacent to the upper surface (2.2).

In the embodiment shown, the first end of the first swiveling rod (3.1) and the first end of the second swiveling rod (3.2) are secured to the rear spar (6.2) at the same attaching point. Also, the second end of the first swiveling rod (3.1) and the second end of the extensible swiveling rod (3.4) are secured to the inner face of the control surface (2) at the same attaching point.

In particular, the auxetic portion (4) of the upper surface (2.2), located preferably between approximately 50% and 75% the chord length, is stretched through the actuation of the primary actuating means (3) which apply a series of forces transmitted by the extensible swiveling rod (3.3) and the swiveling rods (3.2) rotatably secured at one end to the rear spar (6.2) and, at the opposite end, secured by means of respective rotary junctions to corresponding opposite inner faces of the control surface (2).

The second portion (5) may have a positive Poisson ratio (thus being a "conventional" material) or a negative Poisson ratio higher than the Poisson ratio of the first portion (4) (thus having auxetic properties which result in a minor deformation in the transverse plane, with respect to the direction of application of a force, than the ones of the first portion). In the embodiment of FIGS. 5a-5e the second portion (5) is made of conventional material.

On deployment, the first portion (4) of the upper surface (2.2) is stretched in the chordwise direction, while the second portion (5) of the lower surface (2.3) is compressed in the chordwise direction. As a result of the different behavior of the first portion (4) and the second portion (5), a deformation of the control surface and thus of the overall airfoil is achieved. Also, as the upper and lower surfaces are continuous, a better aerodynamic behavior of the deployed airfoil is obtained, without abrupt profile transitions or gaps. In FIGS. 4b and 4c the un-deflected position is represented in dashed line.

Figure 4D:
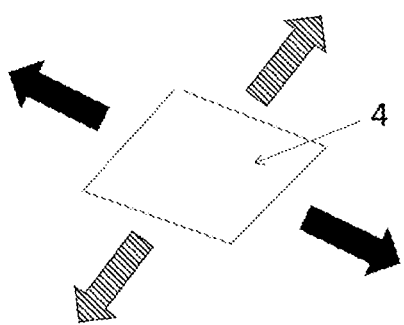
Figure 4E:
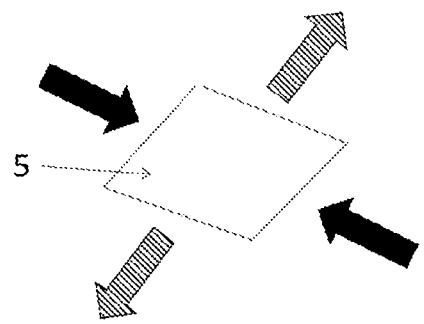

FIGS. 4d and 4e depict the spanwise deformation of the first portion (4) of the upper surface (2.2) and the respective deformation of the second portion (5) of the lower surface (2.3). It can be observed that due to the difference of Poisson ratios of the first portion (4) and the second portion (5), in the chordwise direction the upper surface (2.2) is under expansion (as shown in FIG. 4d) and the lower surface (2.3) is under contraction (as shown in FIG. 4e), as represented by full arrows. However, both the upper and the lower surfaces experiment expansion on the spanwise direction, represented by the dashed arrows.

This similar spanwise deformation on the upper surface (2.2) and the lower surface (2.3) provides a reduction of the transversal bending of the control surface spanwise. Transversal bending deforms the control surface in the spanwise direction and reduces its efficiency and strength. This disadvantage is overcome or at least reduced by the present invention.

Throughout FIGS. 5a to 5g(b), it is depicted representations of conventional materials with a positive Poisson ratio and auxetic materials for illustrative purposes of their characteristics.

Figure 5A:
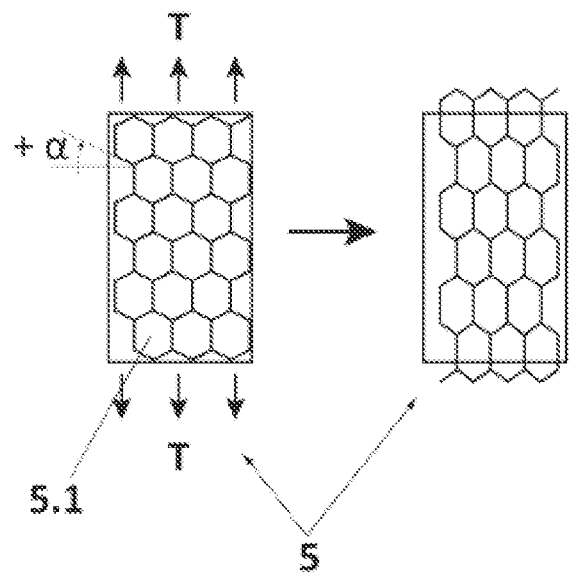
FIGS. 5a to 5g(b) show schematic representations of auxetic and non-auxetic materials.

On one hand, FIG. 5a depicts a 'conventional material' (5) with a positive Poisson ratio, for instance a hexagonal grid structure (5.1) forming a honeycomb design. In this case, applying a unidirectional tensile force (T) in one of the directions of the two in-plane directions of the cells geometry results in an increase in size in that direction and a decrease in size in the other perpendicular direction contained on that plane. On the other hand, applying a unidirectional compression force in one of the directions contained on the plane (not shown in this figure) results in a decrease in size in that direction and an increase in size in the other perpendicular direction contained on that plane. This is also the behavior of conventional materials (5) as the ones used for aircraft structures as aluminum, titanium, steel, other metallic materials, and fiber reinforced polymers with high strength fibers as carbon, fiber glass, etc.

Figure 5B:
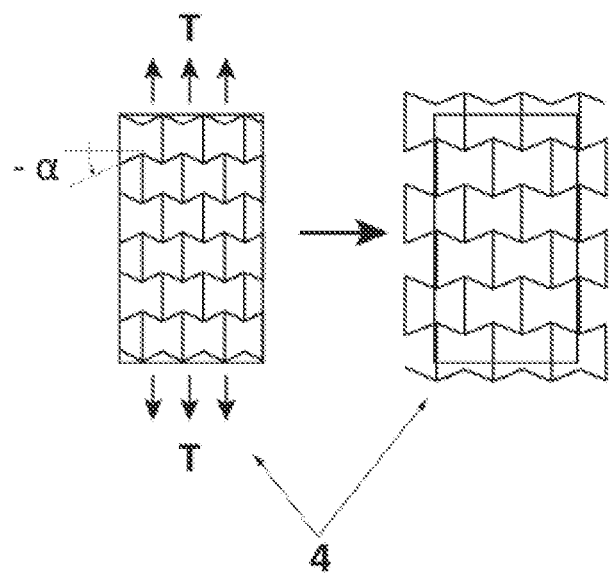
Figure 5C:
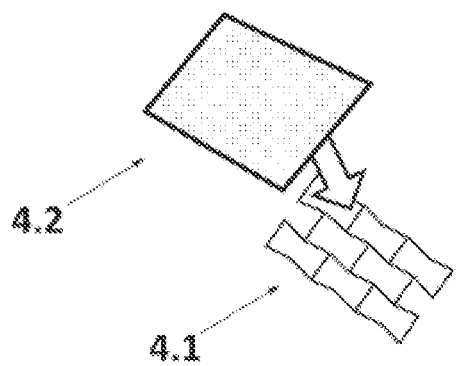
Figure 5D:
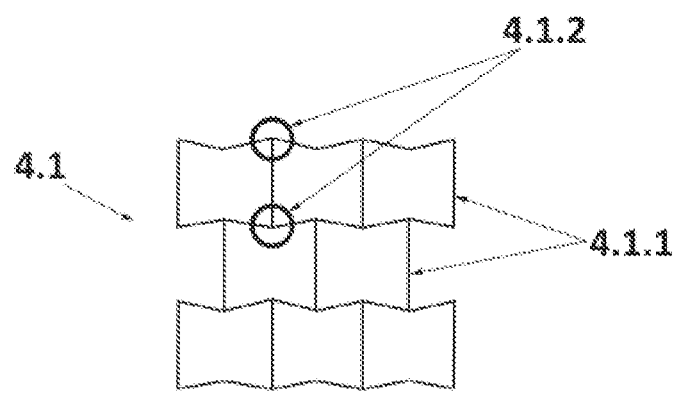

There are materials or structure geometries configurations that exhibit opposite behavior, that are called auxetic and have a negative Poisson ratio. FIGS. 5b to 5d depict an auxetic material (4), namely an auxetic material formed by re-entrant hexagonal structures (4.1) that presents an auxetic behavior in the two in-plane directions of the cells geometry. In this case, when applying a unidirectional tensile force (T) in one of the directions of the two in-plane directions of the cells geometry, the consequences are an increase in size in that direction and also an increase in size in the other perpendicular direction contained on that plane.

On the other hand, applying a unidirectional compression force in one of the directions contained on the plane (not shown in figures) results in a decrease in size in that direction and also a decrease in size in the other perpendicular direction contained on that plane.

Nevertheless, there are other known periodic and non-periodic two dimensional geometric structures that exhibit auxetic behavior and are formed, for instance, by a cell arrangement comprising a plurality of adjoining cells.

As a matter of fact, zones of negative Poisson ratio can be achieved by adding voids or vacancies on conventional materials. The voids or vacancies generate grid-like structures that deform with a negative Poisson ratio.

FIG. 5c presents an auxetic grid structure (4.1) that can be covered by a flexible skin (4.2), such as flexible resin or rubber, joined by mechanical joint such as adhesive or bounding. The flexible skin (4.2) allows deformation of said auxetic material (4.1), coverage of vacancies and assurance of air tightening in order to provide an aerodynamic skin surface.

Additionally, the flexible skin (4.2) material could be co-cured directly with the grid structure (4.1) material if it is also formed by polymer material that can be also reinforced with continuous or discontinuous fibers of high strength materials, such as carbon, fiber glass or others.

Figure 5E:
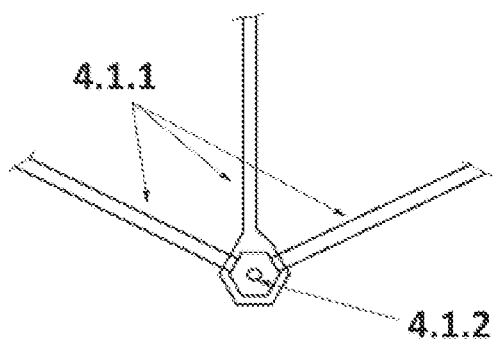

FIGS. 5d and 5e show detailed schematic views of the grid structure (4.1). In FIG. 5d, It can be seen that the grid structure (4.1) comprises a plurality of rigid segments (4.1.1) joined together by means of a plurality of flexible junctions or rotating joints (4.1.2), forming hinges. In particular, the grid structure (4.1) is formed by rotation axis at the ends of the rigid segments (4.1.1), that are normal to the in-plane surface of the cells, allowing rotation of said rigid segments (4.1.1) around said rotation axis but not around the in-plane axis, so that the rigid segments (4.1.1) are not able to deform excessively due to the aerodynamic pressure perpendicular to the in-plane directions of the cells.

Figure 5F:
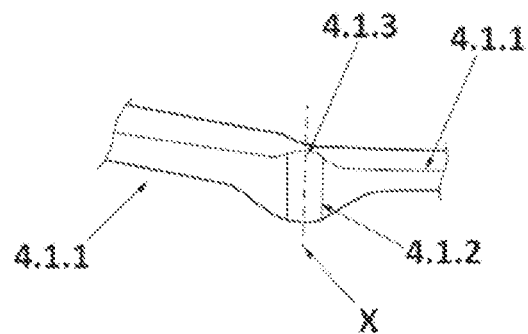
Figure 5G:
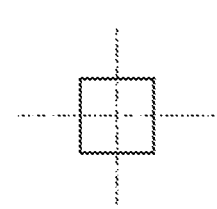
Figure 5G:
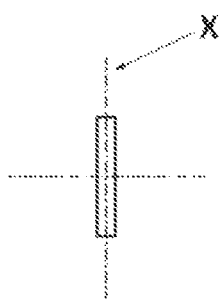

FIGS. 5f and 5g(b) show an alternative embodiment of the flexible junctions (4.1.2) in which the hinge and rotation axis are replaced by a reduction of inertia of the rigid segments (4.1.1) at their interface (4.1.3), i.e. at the points of the grid structure (4.1) where at least two rigid segments (4.1.1) converge. FIGS. 5g(a) and (b) show the cross section of the rigid segments (4.1.1) at the interface (in FIG. 5g(b)) and at a different point not corresponding to the interface (in FIG. 5g(a)).

As it can be seen on FIGS. 5f and 5g(a) and (b), the cross section of the rigid segments (4.1.1) tapers along a longitudinal direction towards the interface (4.1.3) where the rigid segments (4.1.1) converge, such that, as a result of this structural dimension reduction, the inertia moment of the rigid segments (4.1.1) at said interface (4.1.3), in particular around the axis (X) perpendicular to the in-plane directions of the cells geometry, is significantly reduced compared to the other transversal axis of the section of the rigid segment. This way, the rigid segments (4.1.1) can deform in rotation around that first axis (X) of reduced inertia in a much flexible and elastic manner, allowing rotation deformation of said rigid elements (4.1.1) around that first axis (X) and not around the other direction in the plane of the cells geometry.

Also in this case, the inertia of the other axis is higher and the rigid segments (4.1.1) are not able to bend around said axis at their interfaces so that the fairing does not result to be excessively deformed due to the aerodynamic pressure perpendicular to the in-plane directions of the cells.

This embodiment provides the advantage that the junctions of the grid structure (4.1) are removed, and the grid structure (4.1) forms a continuous deformable grid that can be manufactured in one shot, without the complexity of the assembly of all those rotation joints.

Auxetic grid structures (4.1) are also suitable to be manufactured by additive manufacturing with metallic or polymeric material, in particular, for the case implementing continuous deformable grid. If the auxetic grid structure (4.1) is made of polymeric material, the additive polymer could include continuous or discontinuous embedded fibers of carbon, fiber glass, aramid or other high strength materials. Those fibers are deposited at the same time as the polymeric material, which increases the strength of the resulting auxetic grid structure (4.1).

The flexible skin (4.2) is also suitable to be manufactured by additive manufacturing, using elastomeric material deposited on the same additive manufacturing process, with the advantage of reducing time and complexity of the manufacturing and assemblage.

Advantageously, the grid structure (4.1) formed by periodic re-entrant hexagonal cells can be combined with the ones formed by conventional honeycomb hexagon cells (5.1) to present a unique material with higher or lower Poisson ratios on different portions.

Modifying the angle of the hexagonal geometry, the Poisson ratio may be defined as required to exhibit different behaviors across the grid and, also, to control the Poisson ratio magnitude as required for an optimum behavior.

In the embodiment of FIGS. 4a-4e, the first portion (4) is made of an auxetic material with a re-entrant hexagonal structure (4.1) and the second portion (5) is made of a conventional material (5) with a hexagonal honeycomb structure (5.1).

Figure 6A:
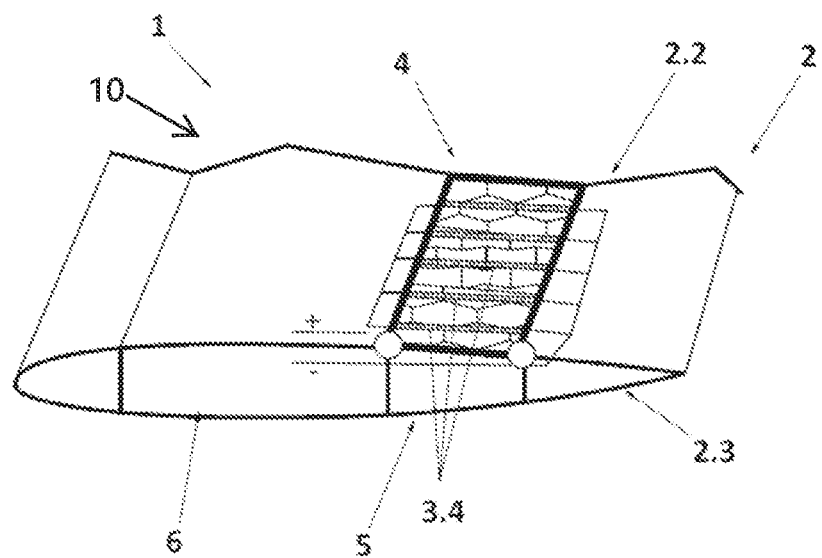
FIGS. 6a to 6e show schematic representations of an airfoil according to embodiments of the present invention.
Figures 6B, 6C:
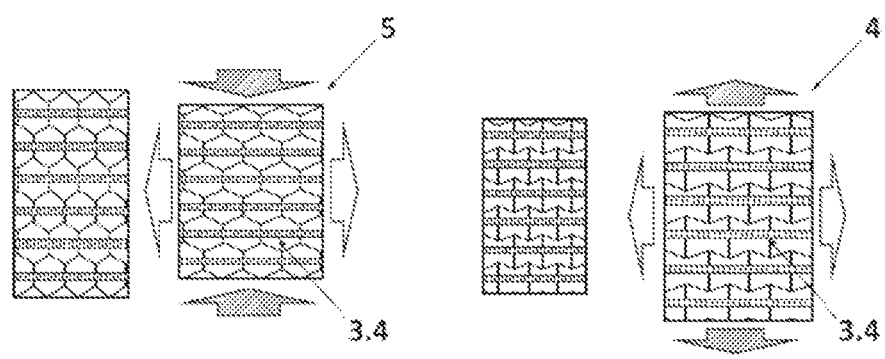
Figure 6D:
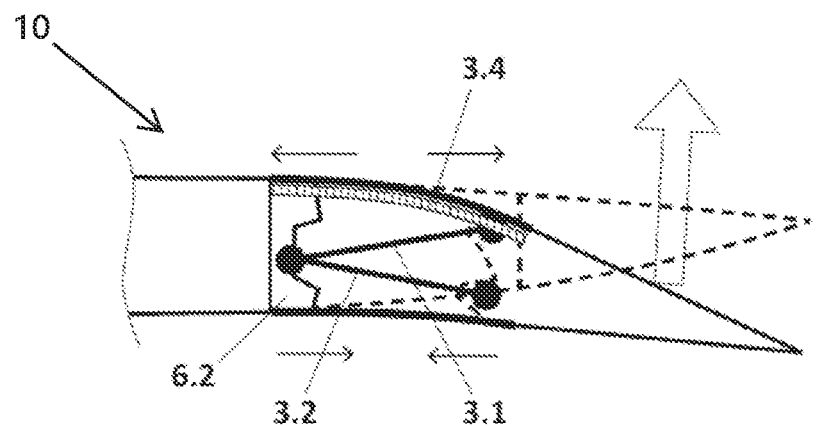

FIGS. 6a and 6d depict an airfoil (1) of an aerodynamic surface (10) according to an embodiment of the invention. In this embodiment the first portion is part of the upper surface (2.2) of the control surface (2) and the second portion (5) is made of a conventional material and is part of the lower surface (2.3) of the control surface (2). In this embodiment, the first portion (4) comprises a flexible grid structure (4.1) and a flexible skin (4.2), as schematically depicted in FIG. 5c. In this embodiment the primary actuating means comprise a plurality of distributed actuators (3.4) embedded within the upper surface (2.2) of the control surface (2) in chordwise direction, in particular within the flexible skin (4.2) which covers the grid structure (4.1) of the first portion (4) of the control surface (2). The primary actuating means further comprise first (3.1) and second (3.2) swiveling rods secured at a first end to the rear spar (6.2) by means of a rotary junction and secured at a second end to an inner face of the control surface (2) by means of a rotary junction. As visible in FIG. 6d, the first swiveling rod (3.1) is secured to said inner face of the control surface (2) at an attaching point adjacent to the upper surface (2.2), whereas the second swiveling rod (3.2) is secured to said inner face of the control surface (2) at an attaching point adjacent to the lower surface (2.3). The actuators (3.4) are configured to actuate the control surface (2) by applying different forces that are responsible for stretching or compressing the first portion (4) and, as a result, compressing or stretching the conventional material of the second portion (5) on the opposite lower surface (2.3) of the control surface (2), respectively.

In particular, the embedded actuators (3.4), can be one of the following: electric, piezo-electric, memory shape material or polymers activated by electrical energy, having a continuous or a distributed pitch that allows to provide improved control of the angle of deflection of the control surface (2).

As represented in FIG. 6d, an additional advantage of this embodiment, compared to the embodiment of FIGS. 4a-4e, is that the conventional dedicated actuator (3.4) in the form of an extensible swiveling rod (such as the one shown in FIG. 4c) is suppressed, and so only two swiveling rods (3.1, 3.2) are included in the actuating means, thus reducing their complexity. Also, the actuation load is more distributed and uniform, thus reducing the concentration of loads and stresses and increasing the strength.

In the embodiments shown in FIGS. 6(a) to 6(e), the grid structure (4.1) of the first portion (4) is formed by periodic re-entrant hexagonal cells and is arranged alternating with portions formed by conventional honeycomb hexagon cells, such that the upper surface (2.2) has higher or lower Poisson ratios on different portions. The conventional portion and the first portion are schematically shown in FIGS. 6b and 6c, respectively, as well as the deformation of said portions when stretched, where full arrows represent stretching tension and striped arrows represent the obtained deformation.

Figure 6E:
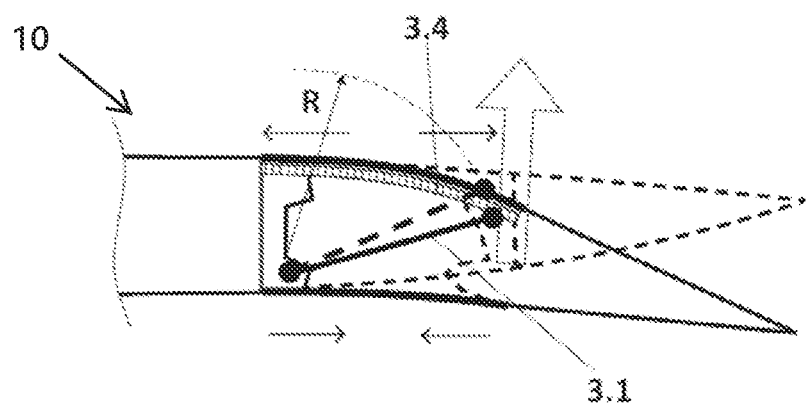

FIG. 6e shows a detailed view of an embodiment of an airfoil (1) similar to the one depicted in FIG. 6d. In this embodiment, the second swiveling rod (3.2) is removed so that only one diagonal first swiveling rod (3.1) is present, reducing even further the complexity of the primary actuating means. According to this embodiment, the rotary junction by means of which the first swiveling rod (3.1) is secured to the rear spar (6.2) is located proximate to the junction between the rear spar (6.2) and the lower surface. When the first portion deforms, the second end of the first swiveling rod (3.1) is constrained to move defining a circumference of radius R, which center is located on the first end of the first swiveling rod (3.1), and the rear rigid movable surface (i.e., the aerodynamic structure of the control surface which is not formed by auxetic material) describes the desired rotation movement. Due to the triangle shape defined by the first portion and the first swiveling rod (3.1), the primary actuating means is able to assure the required deformation of the movable control surface and to support the vertical loads resulting from the aerodynamic forces, with a minimum amount of swiveling rods. In FIGS. 6d and 6e the un-deflected position is represented in dashed line.

Figure 7A:
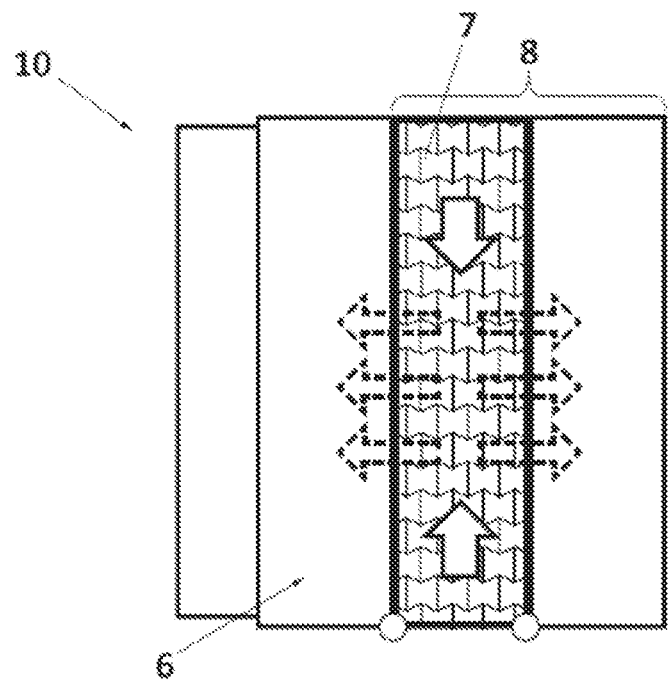
FIGS. 7a to 7e show embodiments of an aerodynamic surface according to the invention.
Figure 7B:
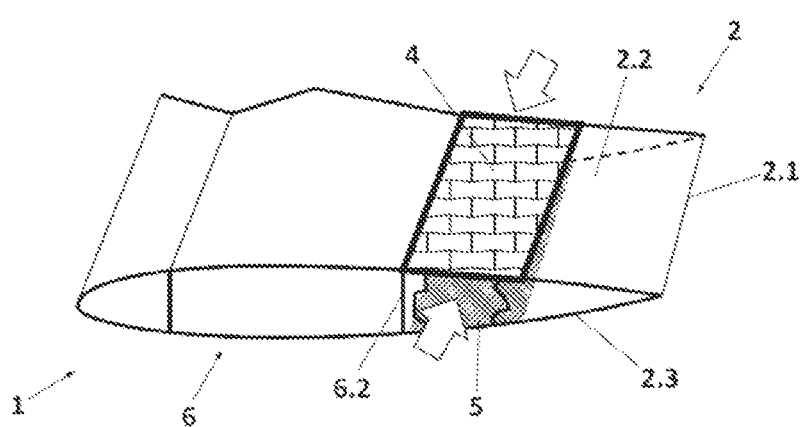

FIG. 7a depicts a top view of an aerodynamic surface (10) comprising a plurality of airfoils (1) presented on FIG. 7b, according to an embodiment of the present invention.

The aerodynamic surface (10) comprises a control surface (8) comprising an upper and a lower surface. The upper surface of the control surface (8) comprises a continuous first strip (7) made of an auxetic material located between approximately 50% and 75% the chord length. The aerodynamic surface (10) comprises actuating means (not shown) configured for applying a force in the spanwise direction to the continuous strip (7). The lower surface of the control surface (8) comprises a second strip comprising a material with a Poisson ratio higher than the Poisson ratio of the first strip (7).

In this embodiment the first portion (4) of each airfoil (1) forming the aerodynamic surface (10) is arranged next to the first portions of adjacent airfoils so that the set of first portions (4) forms the continuous auxetic first strip (7) spanwise. Similarly, the second portion (5) of each airfoil (1)

is arranged next to the second portions of adjacent airfoils so that the set of second portions (5) forms a continuous second strip spanwise.

The primary actuating means (3) of the airfoil (1) are drivable by the force applied spanwise by the actuating means of the aerodynamic surface (10), such that both the first portion (4) on the upper surface (2.2) and the second portion (5) of conventional material on the opposite lower surface (2.3), are configured to be deformed in the chordwise direction. Solid arrows represent the applied forces in the spanwise direction and dashed arrows represent the deflection on the first portion (4) on the chordwise direction.

Figure 7C:
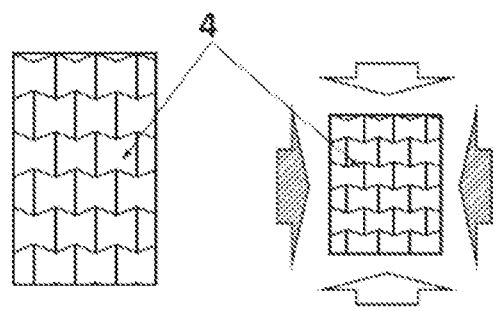
Figure 7D:
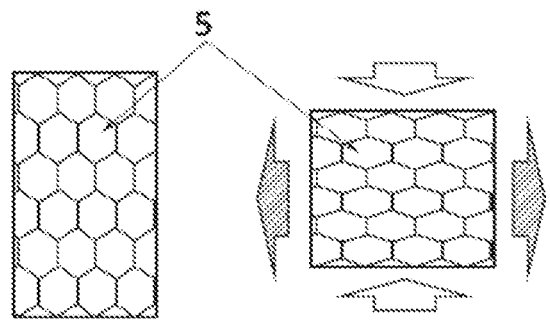
Figure 7E:
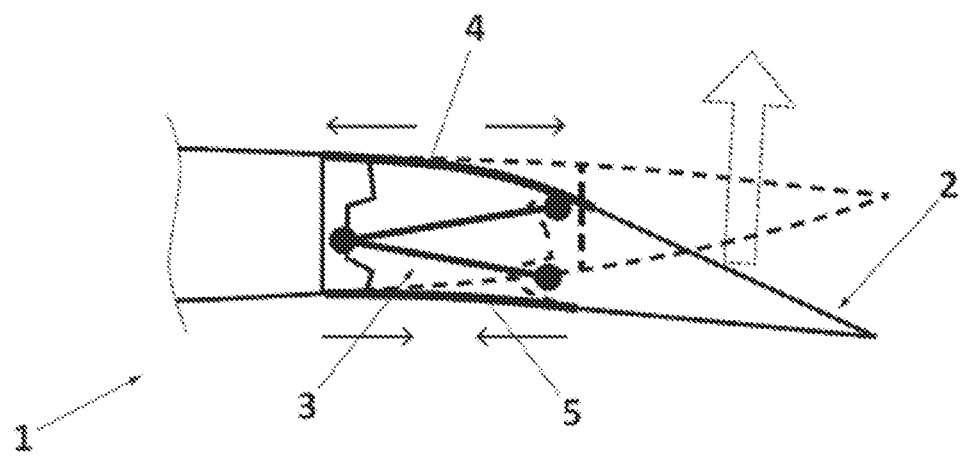

FIG. 7e depicts a detailed view of an airfoil (1) according to the embodiment presented on FIGS. 7a and 7b. It can be seen that opposite deformation of the upper surface (2.2) and lower surface (2.3) in the chordwise direction, schematically shown on FIGS. 7c and 7d, generates desired deflection of the movable control surface (2) of the airfoil (1). In FIG. 7e the un-deflected position of the control surface (2) is represented in dashed line.

FIGS. 8a to 8e depict the embodiment of an aerodynamic surface (10) and airfoil (1) of FIGS. 7a to 7e, wherein the actuating means of said aerodynamic surface (10) comprises a plurality of actuators (9.1) disposed spanwise and configured for applying a force in the spanwise direction to the continuous first strip (7) made of an auxetic material such that said first strip (7) deforms essentially along the chordwise direction. In particular, those actuators (9.1) are embedded within said strip (7) provided on the upper surface and also within the second strip made of conventional material on the opposite lower surface distributed in spanwise direction.

Figure 8A:
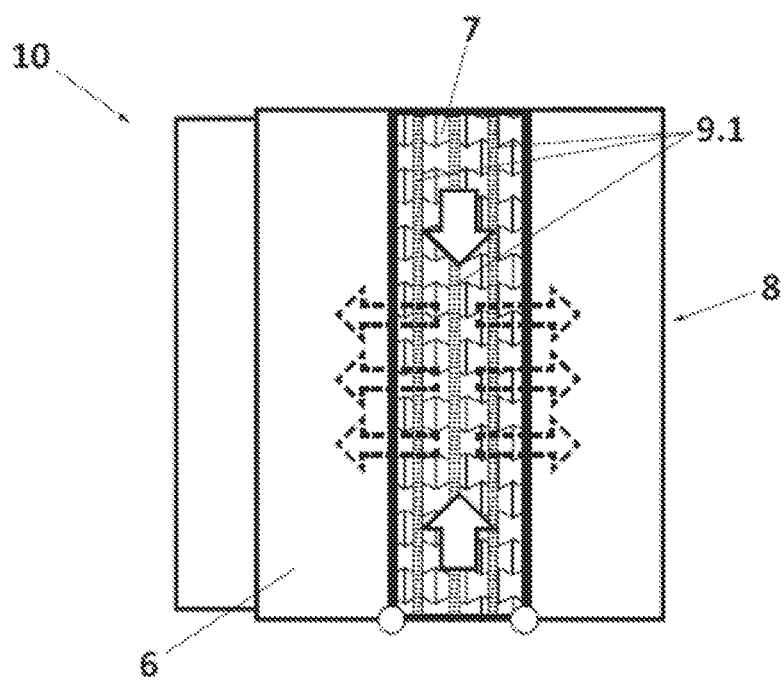
FIGS. 8a to 8e are schematic representations and partial representations of an airfoil according to an embodiment of the invention wherein the actuating means are embedded within the control surface.
Figure 8B:
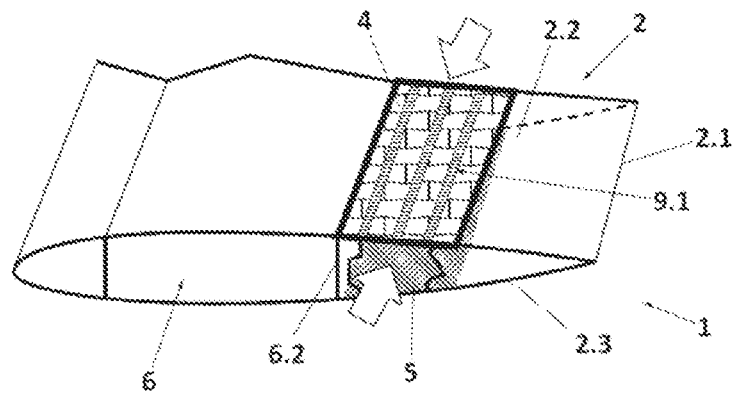
Figure 8C:
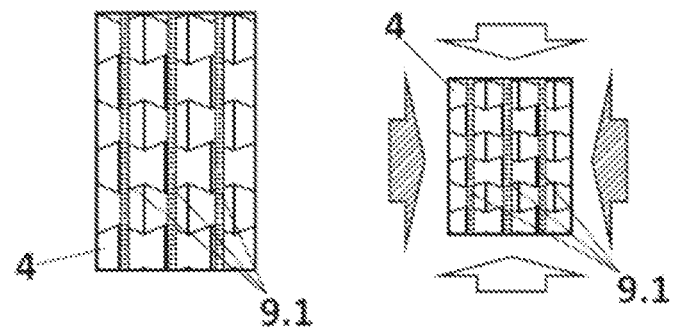
Figure 8D:
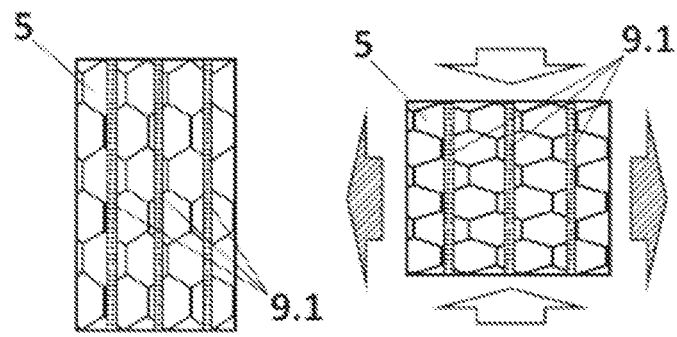
Figure 8E:
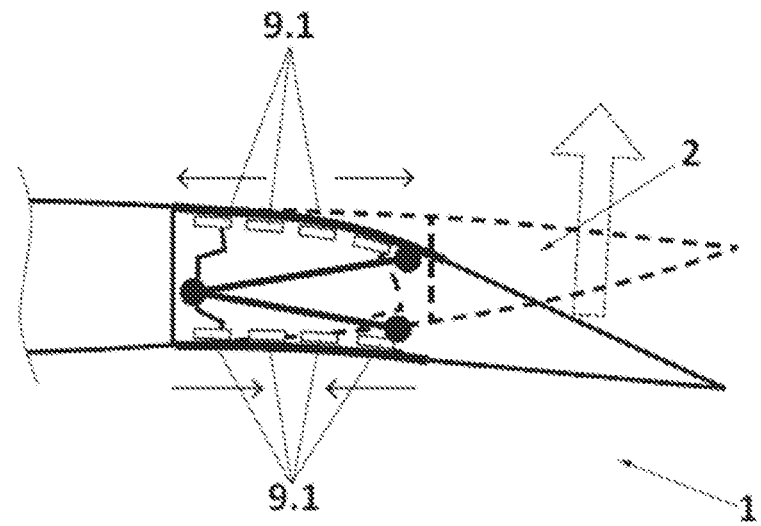

In particular the embedded distributed actuators (9.1) generate traction or compression force on spanwise direction at the same time on both upper (2.2) and lower (2.3) surfaces of the control surface (2) of the airfoils (1), which results, due to the auxetic properties of the material of the first portion (4) of the upper surface (2.2) in a subsequent opposite chordwise deformation. Applied forces in the spanwise direction on both upper (2.2) and lower (2.3) surfaces, in the case of compression, are represented by solid arrows and resulting differential transversal deformations are represented by dashed arrows. In FIG. 8e the un-deflected position of the control surface (2) is represented in dashed line.

In particular, the embedded actuators (9.1) are piezoelectric actuators which produce an expansion or retraction at the same time on the upper surface (2.2) and the lower surface (2.3) of the control surface (2) by increasing or reducing the voltages on both surfaces.

Figure 9:
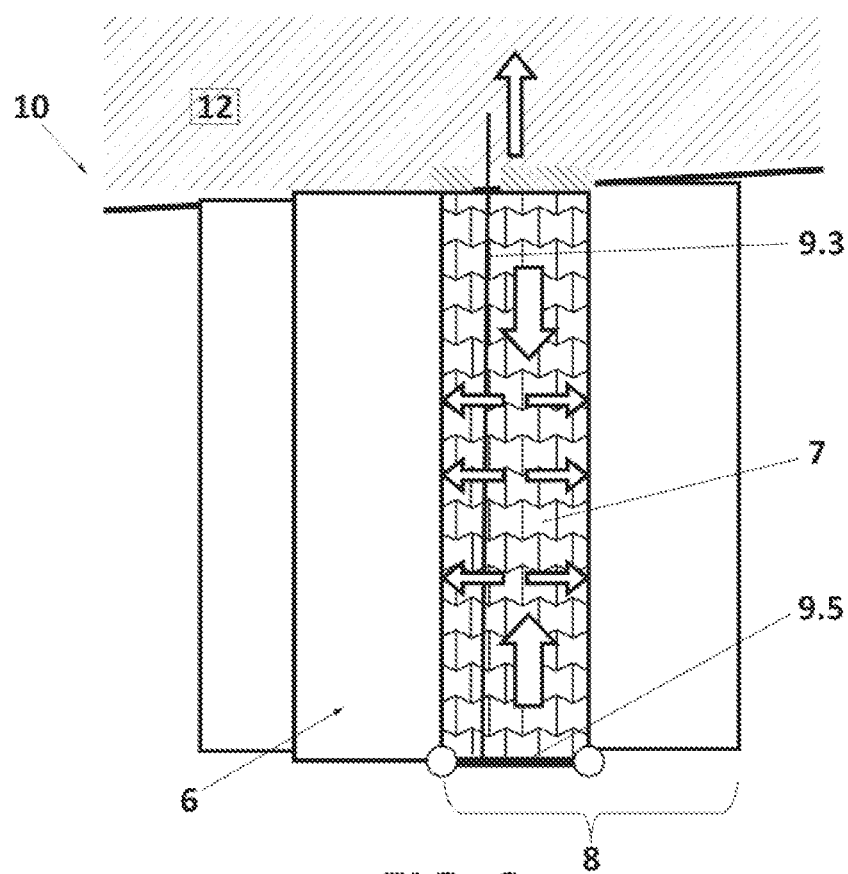
FIG. 9 show embodiments of an aerodynamic surface according to the invention wherein the actuating means is implemented spanwise in the shape of a bar.

FIG. 9 depicts an embodiment of an aerodynamic surface (10) according to the invention. The aerodynamic surface (10) comprises a control surface (8) comprising an upper and a lower surface. The upper surface of the control surface (8) comprises a continuous first strip (7) made of an auxetic material. The lower surface of the control surface (8) comprises a second strip comprising a conventional material. The first strip (7) and the second strip are formed, respectively, by the first (4) and second (5) portions of the airfoils (1) included in the aerodynamic surface (10), arranged adjacent one to another spanwise.

The aerodynamic surface (10) comprises actuating means disposed spanwise and configured for applying a force in the spanwise direction to the continuous first strip (7) made of auxetic material. In this embodiment the actuating means comprise a bar (9.3) for transmitting traction or compression both to the first portion (4) of the upper surface (2.2) and to the second portion (5) of the opposite lower surface (2.3), both in the spanwise direction.

In particular, the bar (9.3) disposed spanwise is adapted to be operable by an actuator located in the aircraft fuselage (12), such as a pneumatic, hydraulic, electric or hybrid actuator. Said bar (9.3) is located along the span from the root to the tip, aft of the torsion box (6), in order to apply a force in the spanwise direction to the continuous first strip (7), which makes said first strip (7) to deform essentially along the chordwise direction and thus activate (i.e. deflect) the control surface (8).

For the transmission of the axial load applied by the bar (9.3) to the rest of elements of the aerodynamic surface, mainly to the first strip (7) of auxetic material, the bar (9.3) is connected to an outboard rib (9.5) or fitting (i.e. a structural element of the aerodynamic surface (10) disposed at a section proximate to the tip, connected to the upper and lower surface). An inboard rib or fitting (not-shown) of the aerodynamic surface (10), located at a section proximate to the fuselage (12), is attached to the upper and lower surface and is fixedly secured to a fixed structure, such as the fuselage (12) or the torsion box (6), to react the traction or compression load transmitted by the outboard rib or fitting (9.5). The inboard rib or fitting may be attached to the fixed structure by means of a rod or other attaching means. Accordingly, when a spanwise load is applied to the bar (9.3) by the actuator (not shown) in the outboard direction (i.e. from the root to the tip) of the aerodynamic surface (10), the bar (9.3) pushes the outboard rib (9.5) or fitting in outboard direction, thus causing traction to the upper and lower surface. The traction in the spanwise direction transmitted to the first strip (7) by means of the outboard rib (9.5) pushed by the bar (9.3) produces the subsequent expansion of the first strip (7) on the chordwise direction and contraction of the second strip. This different deformation on the upper and lower surfaces generates the desired deflection downward of the movable control surface (8).

On the opposite case, when the spanwise load is applied to the bar (9.3) by the actuator (not shown) in the inboard direction (not represented), the load transmitted to the outboard rib (9.5) and reacted by the upper and lower surfaces fixedly secured to the inboard rib, results in the first strip (7) made of auxetic material undergoing compression stress in the spanwise direction which, in turn, results in the compression of the first strip (7) on the chordwise direction and the subsequent extension of the second strip made of conventional material. This different deformation on the upper and lower surface generates, in this case, the desired deflection upward of the movable control surface.

Figure 10A:
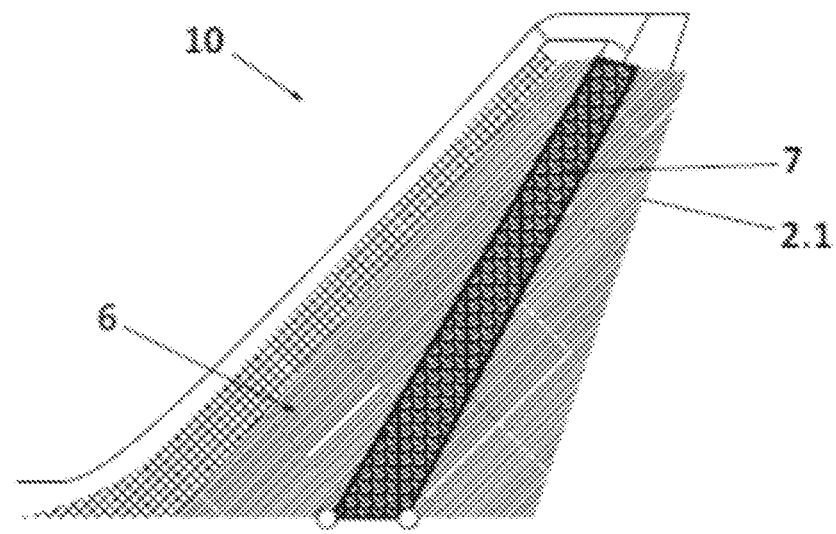
FIGS. 10a and 10b show embodiments of an aerodynamic surface according to the invention.
Figure 10B:
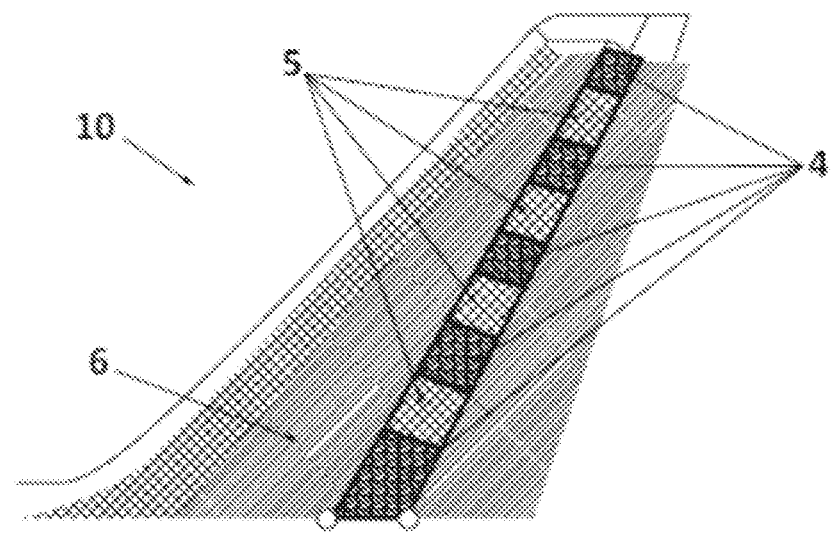

FIGS. 10a and 10b show two embodiments of aerodynamic surfaces (10) according to the second aspect of the present invention, each comprising a plurality of airfoils (1) according to the first aspect of the invention.

FIG. 10a depicts a continuous first strip (7) of auxetic material on the upper surface of the control surface of the aerodynamic surface (10), extending from the root to the tip of said aerodynamic surface. The aerodynamic surface (10) has conventional non-auxetic material on its remaining parts.

In an embodiment, the opposite lower surface of the control surface of the aerodynamic surface (10) (not shown in this figure) comprises non-auxetic material or auxetic material with a higher Poisson ratio.

The embodiment shown in FIG. 10a, provides the advantage of manufacturing a single skin for the entire span in one step without having to join and assemble auxetic and non-auxetic portions spanwise. This can be achieved, for example, by use of known automated manufacturing techniques for composite materials such as pre-preg fibers by automatic tape laying process, or by additive manufacturing techniques.

FIG. 10b shows another embodiment with a continuous strip comprising alternating portions of material with negative Poisson ratio (4) and portions of material with higher Poisson ratio (5) spanwise. In particular, said alternation is made along the entire span from the root to the tip of the aerodynamic surface (10). The remaining upper and lower surface of the control surface of the aerodynamic surface (10) as well as the remaining aerodynamic surface (10) comprises conventional non-auxetic material.

Figure 11:
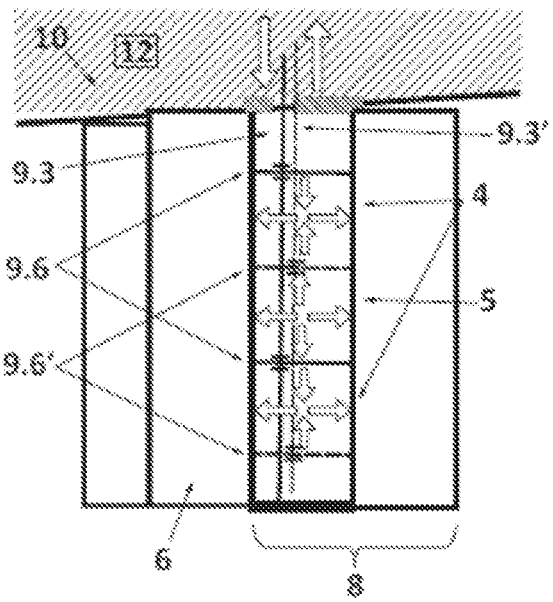
FIG. 11 show embodiments of an aerodynamic surface according to the invention wherein the actuating means is implemented spanwise in the shape of a double bar.

FIG. 11 represents an aerodynamic surface (10) comprising a continuous first strip (7) having alternating portions of material with negative Poisson ratio (4) and material having higher Poisson ratio (5) along the upper surface of the control surface (8) spanwise. The lower surface (not represented) of the control surface (8) of the aerodynamic surface (10) also comprises a second strip having alternating portions of material with negative Poisson ratio and material having higher Poisson ratio. However, the position of the different portions is alternated with respect to the position of the portions of the first strip (7) of the upper surface, so that the expansion of the portions with higher Poisson ratio and contraction of the portions with lower Poisson ratio are produced in the spanwise direction, and as a result all portions of the lower surface experiment contraction on the chordwise direction.

FIG. 11 shows an embodiment of the integration of actuating means disposed spanwise along the aerodynamic surface (10), the actuating means being configured for applying a force in the spanwise direction to the continuous strip.

FIG. 11 depicts a double bar (9.3, 9.3') disposed spanwise and adapted to be operable by pneumatic, hydraulic, electric or hybrid actuators located within the aircraft fuselage (12). Advantageously, having a continuous structure actuated from the fuselage (12) and without movable joints or axis facilitates access for maintenance and assembly. For instance, this embodiment is of special application in multispar aerodynamic surfaces.

It is observed that the actuating means comprises a plurality of ribs (9.6, 9.6') distributed chordwise and bars (9.3, 9.3') distributed spanwise.

In particular, the ribs (9.6, 9.6') are located in between the auxetic portion (4) and conventional non auxetic portion (5) of the upper and lower surface respectively and are able to transmit movements of the bars (9.3, 9.3') to the ribs (9.6, 9.6'). The bars (9.3, 9.3') are mechanically in contact with the ribs (9.6, 9.6'). While the first bar (9.3) is configured to expand the first set of ribs (9.6), the second bar (9.3') is configured to contract the second set of ribs (9.6') or the other way around.

Both bars (9.3, 9.3') apply opposite forces to each set of ribs (3.6, 3.6') so that the upper surface (2.2) presents a spanwise expansion of the auxetic portion (4) and a spanwise contraction of the non-auxetic portions (5). Therefore, due to the different Poisson ratio, all portions of the upper surface experiment expansion on the chordwise direction.

The expansion of the portions of the first strip (7) on the upper surface and the contraction of the portions of the second strip on the lower surface, both in the chordwise direction, produces the desired downward deflection of the movable control surface (8). Thus, opposite upward deflection of the movable control surface (8) is produced when the first bar (9.3) pulls inboard one set of ribs (9.6) while the second bar (9.3') pushes outboard the other set of ribs (9.6').

This allows compensating forces and consequently not generating an overall deformation along the span.

Figure 12:
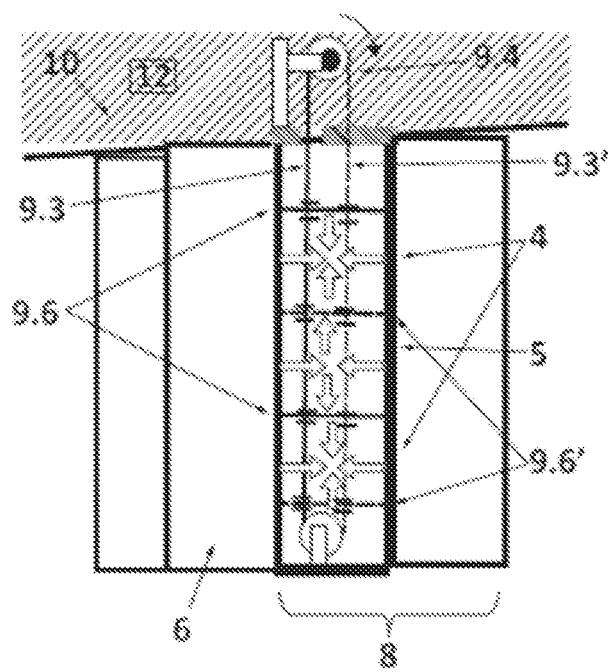
FIG. 12 show embodiments of an aerodynamic surface according to the invention wherein the actuating means is implemented spanwise in the shape of a cable driven by a rotating device.

FIG. 12 depicts an embodiment in which the double bar (9.3, 9.3') has been replaced by a cable or chain. Advantageously, the cable is in a closed loop configuration, wherein both segments (9.3, 9.3') of the cable can be actuated by an actuator (9.4) in the shape of a rotating device and a pulley provided at a section proximate to the tip of the aerodynamic surface (10).

Figure 13A:
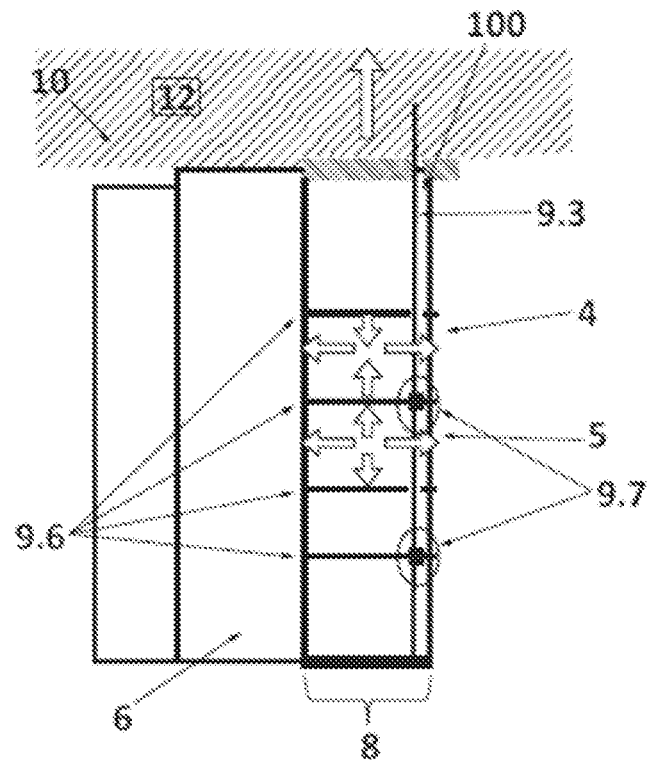
FIGS. 13a to 13c show embodiments of an aerodynamic surface according to the invention and a partial representation of an airfoil according to an embodiment of the invention comprising a control tab.

FIG. 13a, in turn, represents an aerodynamic surface (10) according to FIG. 10b comprising a bar (9.3) located proximate to the trailing edge of the movable control surface (8), that is, close to 100% the chord length of the airfoil (1). Said bar (9.3) is configured to actuate a tab (100) of the control surface (2) from the fuselage (12) by means of a plurality of distributed secondary actuators (9.7).

Figure 13B:
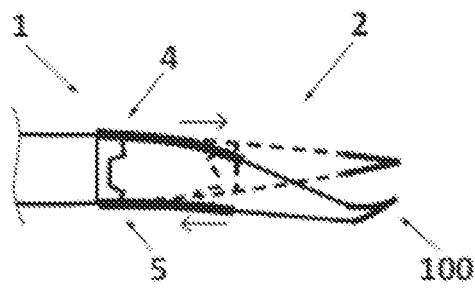
Figure 13C:
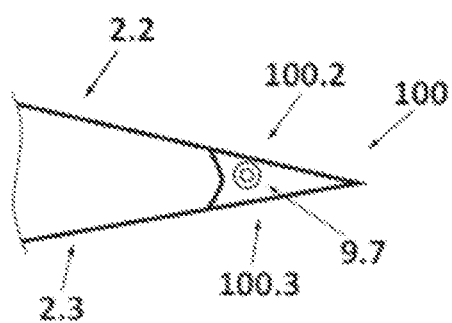

As it can be observed in FIGS. 13b and 13c, the tab (100) may be rigid or may comprise an auxetic portion on one of its surfaces (100.2, 100.3). Therefore, its combined actuation with the entire control surface (8) may be done by turning secured connections of the secondary actuating means (9.7), seen in FIG. 13c, to the bar, or benefiting from the inverse deformation of a first portion comprising an auxetic material (4) in relation to conventional portions/portions with a higher Poisson ratio (5) and be properly deployed by loads transferred from said first portion (4) of the control surface (2).

The actuation of the tab (100) provides the ability to perform a more pronounced deflection of the control surface (2). Said deflection angle of the tab (100) can be either in the same direction or in the opposite direction of the deflection angle of the first portion (4) of the control surface (2).

In an embodiment where the tab (100) comprises an auxetic portion at one of its surfaces (100.2, 100.3), the actuation of the control surface (2) causes the deployment of the tab (100).

FIG. 13b shows a section view of an airfoil (1) with two superimposed states, i.e., when neither the control surface (2) nor the tab (100) are deployed (the control surface (2) is shown with discontinuous lines), and when both are deployed (the control surface (2) is shown with solid lines). The tab (100) is shown in bold lines in both states.

Throughout the description, the first portion (4) has been described as comprised in the upper surface (2.2), whereas the second portion (5) having a Poisson ratio higher than the Poisson ratio of the first portion (4) has been described as comprised in the lower surface (2.3) and as embodied as a conventional material, i.e. a material having a positive Poisson ratio. Alternatively, the upper surface (2.2) could be the one comprising an auxetic material with a higher negative Poisson ratio (i.e., the second portion (5)) and the lower surface (2.3) could be the one comprising an auxetic material with lower negative Poisson ratio (i.e., the first portion (4)). In that particular case, the expansion in both surfaces (2.2, 2.3) in the spanwise direction will produce an expansion in the chordwise direction on both surfaces (2.2, 2.3), but the upper surface (2.2) will have a higher expansion chordwise compared to the lower surface (2.3). As a result, the movable control surface (2) will experiment a bending downward and a rear expansion that will increase the chord of the aerodynamic surface (10) and its curvature at the same time. This produces additional advantage for the aerodynamic efficiency of the airfoil (1) that will be able to provide more lift.

As a consequence, the higher the difference of Poison ratio between the upper surface (2.2) and lower surface (2.3) (i.e., between the first (4) and second (5) portions) is, the more curvature is generated. On the contrary, the lower the difference of Poisson ratio between the upper surface (2.2) and lower surface (2.3) is, the more chordwise expansion is generated.

Description of the invention has been performed in relation to the rear part of the airfoil (1), from the rear spar (6.2) to the trailing edge, and provides an alternative to the conventional trailing edge control surfaces (8) elevator, rudder or flap. However, the proposed invention is also applicable to the front part of the airfoil (1), from the front spar (6.4) to the leading edge, and provides an alternative to the conventional leading edge movable control surfaces as slats.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both, unless the this application states otherwise. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An airfoil of an aerodynamic surface, the airfoil comprising:
    a control surface comprising an upper surface and a lower surface, and
    a primary actuator assembly configured to elevate or lower the control surface;
    wherein at least a first portion of one of the upper surface and the lower surface of the control surface is auxetic with a negative Poisson ratio, and at least a second portion of the other of the upper surface and the lower surface of the control surface comprises a material with a Poisson ratio higher than the Poisson ratio of the first portion.

2. The airfoil according to claim 1, wherein the airfoil further comprises:
    a torsion box including an upper skin, a lower skin, a rear spar and a front spar,
    wherein the control surface is aft of said rear spar and the first portion extends to the rear spar such that said first portion bridges:
    the upper skin of the torsion box and the upper surface of the control surface; or
    the lower skin of the torsion box and the lower surface of the control surface.

3. The airfoil according to claim 2, wherein the primary actuator comprises a first swiveling rod including a first end secured to the rear spar or the front spar by a first rotary junction and a second end of the first swiveling rod is secured by a second rotary junction to an inner face of the control surface adjacent to a surface comprising the first portion.

4. The airfoil according to claim 3, wherein the primary actuator comprises a second swiveling rod including a first end secured to the rear spar or the front spar by a first rotary junction adjacent the rotary junction of the first swiveling rod and the second swiveling rod includes a second end secured by a second rotary junction to an inner face of the control surface adjacent the surface opposite to the surface comprising the first portion.

5. The airfoil according to claim 1, wherein the airfoil further comprises:
    a torsion box comprising an upper skin, a lower skin, a rear spar and a front spar,
    wherein the control surface is forward of said front spar and the first portion extends to the front spar such that said first portion bridges:
    the upper skin of the torsion box and the upper surface of the control surface; or
    the lower skin of the torsion box and the lower surface of the control surface.

6. The airfoil according to claim 1, wherein the first portion comprises a flexible grid structure covered by a flexible skin.

7. The airfoil according to claim 6, wherein the flexible grid structure comprises rigid segments joined together by flexible junctions or by rotatable joints intersections of the rigid segments.

8. The airfoil according to claim 1, wherein the primary actuator assembly comprises a first actuator configured to exert a force on the control surface along a spanwise direction of the airfoil.

9. The airfoil according to claim 8, wherein the first actuator is embedded within the first portion and disposed along a chordwise direction of the airfoil.

10. The airfoil according to claim 9, wherein the primary actuator comprises a second actuator embedded within the second portion and disposed along the chordwise direction.

11. The airfoil according to claim 1, wherein the primary actuator comprises a plate arranged chordwise and attached to the first portion and to the second portion, wherein the plate is adapted to be actuated by a force in a spanwise direction of the airfoil, wherein the force displaces the plate such that the plate transfers a compression load or a traction load to the first portion and the second portion.

12. The airfoil according to claim 1, wherein the control surface further comprises at the trailing edge a control tab and a secondary actuator configured to elevate or lower the control tab.

13. The airfoil according to claim 1, wherein the control surface comprises cellular elements housed between the upper surface and the lower surface,
    wherein the primary actuator is configured to selectively stretch or compress the cellular elements.

14. An aerodynamic surface comprising the airfoil according to claim 1.

15. The aerodynamic surface according to claim 14, wherein the first portion is a first continuous strip with a negative Poisson ratio extending spanwise along the control surface, and the second portion is a second continuous strip comprising a material with a Poisson ratio higher than the Poisson ratio of the first continuous strip.

16. The aerodynamic surface according to claim 15, further comprising an actuating assembly disposed spanwise and configured to apply a force in the spanwise direction to a deform strip comprising a material with negative Poisson ratio.

17. The aerodynamic surface of claim 14, wherein at least one of the first portion and the second portion is a continuous strip with alternating portions of material with negative Poisson ratio and higher Poisson ratio spanwise.

* * * * *